(12) United States Patent
Matsumoto et al.

(10) Patent No.: US 9,321,944 B2
(45) Date of Patent: Apr. 26, 2016

(54) EASILY DISMANTLABLE ADHESIVE AGENT COMPOSITION AND EASILY DISMANTLABLE ADHESIVE TAPE

(75) Inventors: Akikazu Matsumoto, Osaka (JP); Eriko Sato, Osaka (JP); Akinori Morino, Kitaadachi-gun (JP); Koujirou Tanaka, Osaka (JP)

(73) Assignees: DIC CORPORATION, Tokyo (JP); OSAKA CITY UNIVERSITY, Osaka-shi, Osaka (JP)

( * ) Notice: Subject to any disclaimer, the term of this patent is extended or adjusted under 35 U.S.C. 154(b) by 0 days.

(21) Appl. No.: 14/122,476

(22) PCT Filed: Jun. 1, 2012

(86) PCT No.: PCT/JP2012/064303
§ 371 (c)(1),
(2), (4) Date: Dec. 27, 2013

(87) PCT Pub. No.: WO2012/165625
PCT Pub. Date: Dec. 6, 2012

(65) Prior Publication Data
US 2014/0171591 A1 Jun. 19, 2014

(30) Foreign Application Priority Data

Jun. 2, 2011 (JP) .................. 2011-124508
Sep. 29, 2011 (JP) .................. 2011-215491

(51) Int. Cl.
| | | |
|---|---|---|
| C09J 7/00 | (2006.01) | |
| C09J 133/08 | (2006.01) | |
| C09J 133/06 | (2006.01) | |
| C09J 153/00 | (2006.01) | |
| C08F 293/00 | (2006.01) | |
| C08K 5/42 | (2006.01) | |

(52) U.S. Cl.
CPC ........... *C09J 133/08* (2013.01); *C08F 293/005* (2013.01); *C09J 7/00* (2013.01); *C09J 133/066* (2013.01); *C09J 153/005* (2013.01); *C08K 5/42* (2013.01); *C09J 2205/102* (2013.01); *C09J 2433/00* (2013.01); *C09J 2453/00* (2013.01)

(58) Field of Classification Search
CPC ............... C09J 7/0217; C09J 7/0221
See application file for complete search history.

(56) References Cited

U.S. PATENT DOCUMENTS

| 6,703,073 B2 * | 3/2004 | Husemann et al. ......... 427/208.4 |
| 6,806,320 B2 * | 10/2004 | Everaerts et al. .......... 525/330.3 |
| 2004/0009113 A1 | 1/2004 | Sion |
| 2004/0028895 A1 | 2/2004 | Yamakami et al. |
| 2005/0234199 A1 | 10/2005 | Taniguchi et al. |
| 2007/0265404 A1 | 11/2007 | Yamago et al. |
| 2008/0194759 A1 | 8/2008 | Casper |
| 2009/0299008 A1 | 12/2009 | Yamago et al. |
| 2012/0070660 A1 | 3/2012 | Miyazaki et al. |
| 2012/0196952 A1 | 8/2012 | Suzuki |

FOREIGN PATENT DOCUMENTS

| CN | 1278544 A | 1/2001 |
| EP | 2186867 A1 | 5/2010 |
| JP | 56-500889 A | 7/1981 |
| JP | 09-137145 A | 5/1997 |
| JP | 10-140093 A | 5/1998 |
| JP | 11-143079 A | 5/1999 |
| JP | 2001-270912 A | 10/2001 |
| JP | 2002-167566 A | 6/2002 |
| JP | 2003-313527 A | 11/2003 |
| JP | 2004-043732 A | 2/2004 |
| JP | 2004-323693 A | 11/2004 |
| JP | 2005-023205 A | 1/2005 |
| JP | 2006-225524 A | 8/2006 |
| JP | 2006-299278 A | 11/2006 |
| JP | 2007-186606 A | 7/2007 |
| JP | 2008-291216 A | 12/2008 |
| JP | 2009-149877 A | 7/2009 |
| JP | 2010-070597 A | 4/2010 |
| JP | 2010-241961 A | 10/2010 |
| JP | 2012-126879 A | 7/2012 |
| WO | 81/00309 A1 | 2/1981 |
| WO | 2004/014818 A1 | 2/2004 |
| WO | 2006/001496 A1 | 1/2006 |
| WO | 2006/062255 A1 | 6/2006 |
| WO | 2010/126123 A1 | 11/2010 |

OTHER PUBLICATIONS

Benedek et al. (Handbook of Pressure-Sensitive Adhesives and Products: Technology of Pressure-Sensitive Adhesives and Products, CRC Press, 2009, p. 7-4).*
Machine translation of JP2004-043732 A to Fujita et al.*
Machine translation of JP2003-313527.*
Artur Michalak and Tom Ziegler, JACS 2001, 123, 12266-12278.*
International Search Report of PCT/JP2012/064300, mailing date of Aug. 14, 2012.
International Search Report of PCT/JP2012/064303, mailing date of Aug. 14, 2012.
International Search Report of PCT/JP2012/064295, mailing date of Aug. 21, 2012.
International Search Report of PCT/JP2012/064485, mailing date of Sep. 4, 2012.
U.S. Appl. No. 14/122,299, filed Nov. 26, 2013.
U.S. Appl. No. 14/122,589, filed Nov. 26, 2013.
U.S. Appl. No. 14/124,167, filed Dec. 5, 2013.

(Continued)

*Primary Examiner* — Vu A Nguyen
(74) *Attorney, Agent, or Firm* — Westerman, Hattori, Daniels & Adrian, LLP

(57) ABSTRACT

Suitable adhesive properties and dismantling properties can be obtained, and an interface between an adherent/an adhesive layer or an adhesive layer/a substrate can be suitably dismantlable by the easily dismantlable adhesive composition including an acrylate polymer including a (meth)acrylate monomer having a carboxyl precursor group, 2-ethyl hexyl acrylate, and a monomer having a polar group as a monomer, and an acid catalyst or an acid generator.

10 Claims, 14 Drawing Sheets

(56) References Cited

OTHER PUBLICATIONS

Extended European Search Report dated Oct. 1, 2014, issued in related European Application No. 12793071.7. (6 pages).
Extended European Search Report dated Oct. 1, 2014, issued in related European Application No. 12793415.6 (6 pages).
Extended European Search Report dated Oct. 1, 2014, issued in related European Application No. 12792020.5. (6 pages).
Office Action dated Dec. 18, 2014, issued in related Chinese Patent Application No, 201280026905.5, with English translation (11 pages).
Non-Final Office Action dated Jul. 10, 2015, issued in U.S. Appl. No. 14/122,299 (20 pages).
Communication pursuant to Rule 164(1) EPC dated May 20, 2015, issued in counterpart European Patent Application No. 12796812.1 (4 pages).
Iizawa, et al., "Thermal acid-catalyzed deesterification of poly(t-butyl acrylate)s using thermo-generated acid catalysts", Kobunshi Ronbunshu, Aug. 1998, pp. 490-496, vol. 55, No. 8, w/English abstract, cited in European Communication dated May 20, 2015.
Yavuz, et al., "Electrorheological Properties of Suspensions Prepared from Poly(Li-tert-butyl methacrylate) Ionomer", Turkish Journal of Chemistry, 2004, pp. 587-601; cited in European Search Report dated May 26, 2015.
U.S. Office Action issued Sep. 29, 2015 for related U.S. Appl. No. 14/124,167 (12 pages).
Non-Final Office Action dated Mar. 7, 2016, issued in U.S. Appl. No. 14/122,299 (20 pages).

* cited by examiner

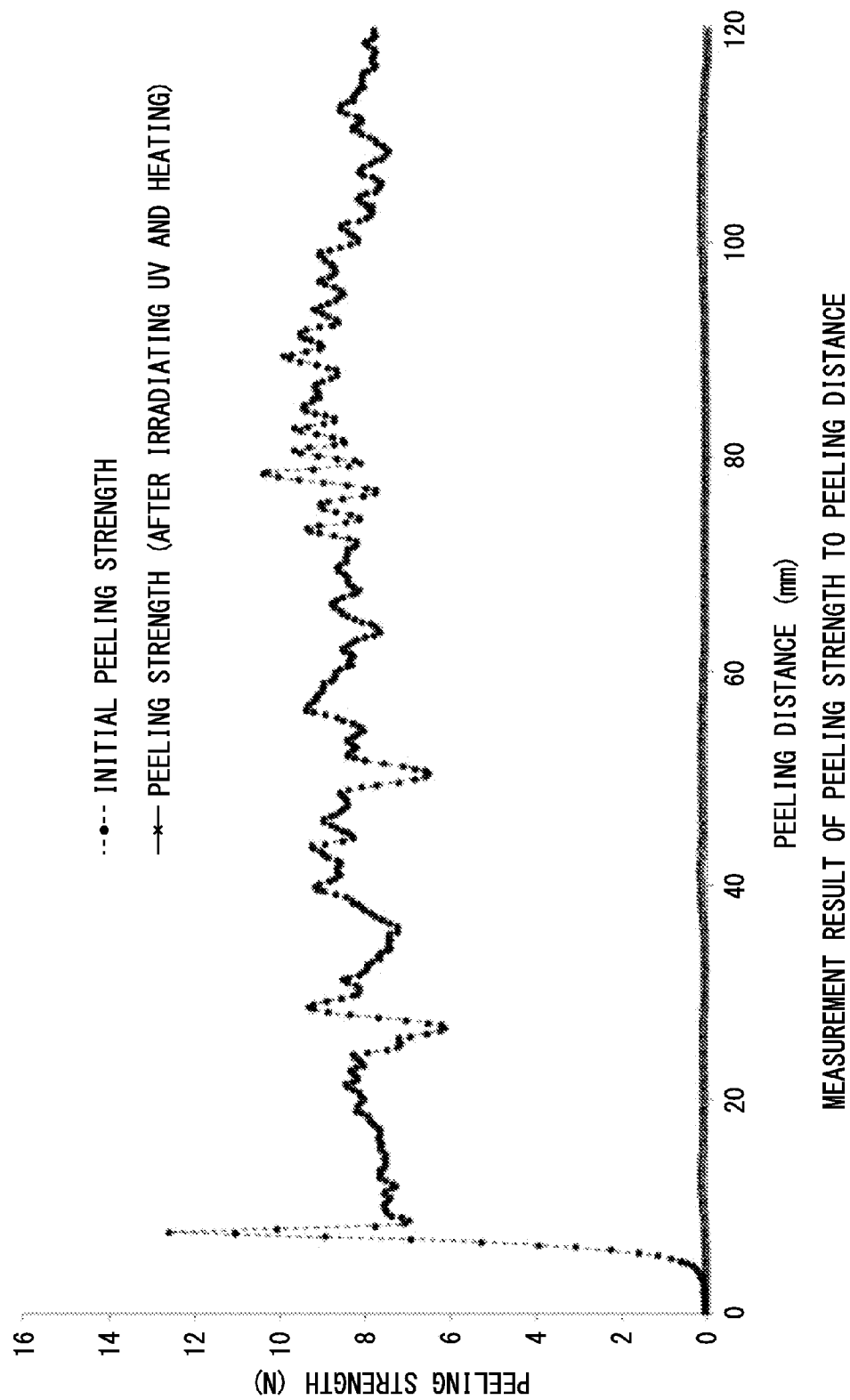

EASILY DISMANTLABLE ADHESIVE AGENT COMPOSITION AND EASILY DISMANTLABLE ADHESIVE TAPE

TECHNICAL FIELD

The present invention relates to an easily dismantlable adhesive tape which enables easy dismantling of attachment with an adherend or fixation of members therebetween after the adhesive tape is attached to the adherend or used to fix the members therebetween and then a certain period of time has elapsed, and an easily dismantlable adhesive composition which composes the easily dismantlable adhesive tape.

BACKGROUND ART

An adhesive tape is used as a reliable adhesive joint member having excellent workability to fix members therebetween, temporarily fix members therebeween, label product information, or the like, in industrial fields such as office automation equipment, IT—home electric appliances, or automobiles. In recent years, the demand for recycling and reusing used products has increased in various industrial fields such as home electrical appliances or automobiles from the standpoint of protection of the earth's environment. In the case where various products are recycled or reused, although adhesive tapes used to fix members or as labels are required to be peeled therefrom, the adhesive tapes are used on various positions in the products, and therefore a decrease in the operation cost by performing a simple removing process is demanded.

As an easily dismantlable adhesive tape, an adhesive member having at least two adhesive layers, the adhesive strengths of which are different from each other, is disclosed, for example (see Patent Document 1). The adhesive tape is an adhesive member which realizes both strong fixation of an adherend and easy dismantling at a weakly-adhesive layer serving as the separation surface by joining the adherend via the weakly-adhesive layer of the adhesive member including adhesive layers with a superposed structure. However, the adhesive member has a problem in that the production cost thereof increases, because plural adhesive layers are essential components thereof. In addition, since the structure of the adhesive member allows bonding with an adherend via the weakly-adhesive layer, there is a limitation on an increase in the adhesive strength thereof, and it is difficult for the adhesive member to be used to strongly fix members. In particular, the adhesive properties may be decreased under low temperature conditions. Due to this, it is desirable to achieve dismantling while maintaining stable adhesive strength under ordinary temperature or lower temperature conditions.

As another easily dismantlable adhesive composition, an adhesive composition containing an aliphatic polyester is disclosed (see Patent Document 2). The adhesive composition is disclosed to be easily delaminable due to hydrolysis-promoting action of polycaprolactone when immersed in hot water in a peeling process. However, since the adhesive composition requires to be immersed in hot water when peeling is performed, the equipment cost is high when the adhesive composition is applied to a part having a large size to be dismantlable, and the adhesive composition cannot be applied to parts to which water cannot be applied when reused, such as electronic parts.

An adhesive composition containing a block copolymer obtained by preparing an acrylic copolymer having a carboxyl precursor group (—COOt-butyl) in an acrylic polymer block and then converting the carboxyl precursor group to a carboxyl group is disclosed as an adhesive composition using an acrylic block copolymer (see Patent Document 3). Although the adhesive composition is obtained by preparing an acrylic copolymer having a t-butyl group in a side chain thereof as a carboxyl precursor group, the t-butyl group does not remain in the obtained adhesive composition, and no dismantling properties are exhibited.

CITATION LIST

Patent Document

[Patent Document No. 1] Japanese Unexamined Patent Application, First Publication No. H10-140093
[Patent Document No. 2] Japanese Unexamined Patent Application, First Publication No. H9-137145
[Patent Document No. 3] Japanese Unexamined Patent Application, First Publication No. 2002-167566

SUMMARY OF INVENTION

Technical Problem

In order to solve the above problems, the present invention aims to provide an easily dismantlable adhesive tape which enables favorable adhering to an adherend or fixation of members therebetween under ordinary temperature and lower temperature conditions, and which enables easy dismantling by performing heating or energy ray irradiation without using water such as hot water when dismantling is performed, and an adhesive composition which enables formation of the easily dismantlable adhesive tape.

Solution to Problem

The present invention includes the following aspects.
The present invention includes the following aspects.
(1) An easily dismantlable adhesive composition including an acrylic polymer, and an acid catalyst or an acid generator, wherein the acrylic polymer includes a (meth)acrylate monomer having a carboxyl precursor group, 2-ethyl hexyl acrylate, and a monomer having a polar group as a monomer.
(2) The easily dismantlable adhesive composition according to (1), wherein the (meth)acrylate monomer having a carboxyl precursor group is at least one selected from the group consisting of tert-butyl(meth)acrylate, 2-methyl-2-adamantyl(meth)acrylate, 2-ethyl-2-adamantyl(meth)acrylate, bornyl(meth)acrylate, isobornyl(meth)acrylate, cyclohexyl(meth)acrylate, and benzyl(meth)acrylate.
(3) The easily dismantlable adhesive composition according to (1) or (2), wherein the monomer having a polar group is a vinyl monomer having a hydroxyl group.
(4) The easily dismantlable adhesive composition according to any one of (1) to (3), wherein the content of the (meth) acrylate monomer having a carboxyl precursor group is in the range of 1 to 75% by mass in the total amount of the monomer constituting the acrylic polymer.
(5) The easily dismantlable adhesive composition according to any one of (1) to (4), wherein the content of the monomer having a polar group is in the range of 1 to 30% by mass in the total amount of the monomer constituting the acrylic polymer.
(6) The easily dismantlable adhesive composition according to any one of (1) to (5), wherein the acrylic polymer is an acrylic block polymer including a poly(meth)acrylate chain (A) made of the (meth)acrylate monomer having a carboxyl precursor group and a poly(meth)acrylate chain (B) containing the 2-ethyl hexyl acrylate and the monomer having a polar group as a monomer.

(7) An easily dismantlable adhesive tape having an adhesive layer including an easily dismantlable adhesive composition according to any one of (1) to (6).

Effects of Invention

The easily dismantlable adhesive composition of the present invention can be easily dismantlable without an adhesive deposit by means such as heat or light while maintaining excellent adhesive properties under room or low temperature conditions. Therefore, the easily dismantlable adhesive composition of the present invention can be used as a recycled or reused product. For example, the easily dismantlable adhesive composition can be used to fix parts permanently or temporarily or attach a label to show product information in various industrial fields such as OA apparatuses, IT products, home electric appliances, and automobiles. In addition, the easily dismantlable adhesive composition can be easily dismantled by means of a simple heating device or an energy ray irradiation device.

BRIEF EXPLANATION OF FIGURES

FIG. 14 shows the relationship between 180° peeling strength (N/20 mm) and peeling distance (mm/20 mm width) of an adhesive sheet before treatment, and after both heating and UV irradiation in Example 10.

DESCRIPTION OF EMBODIMENTS

[Acrylic Polymer]

Figure 1:
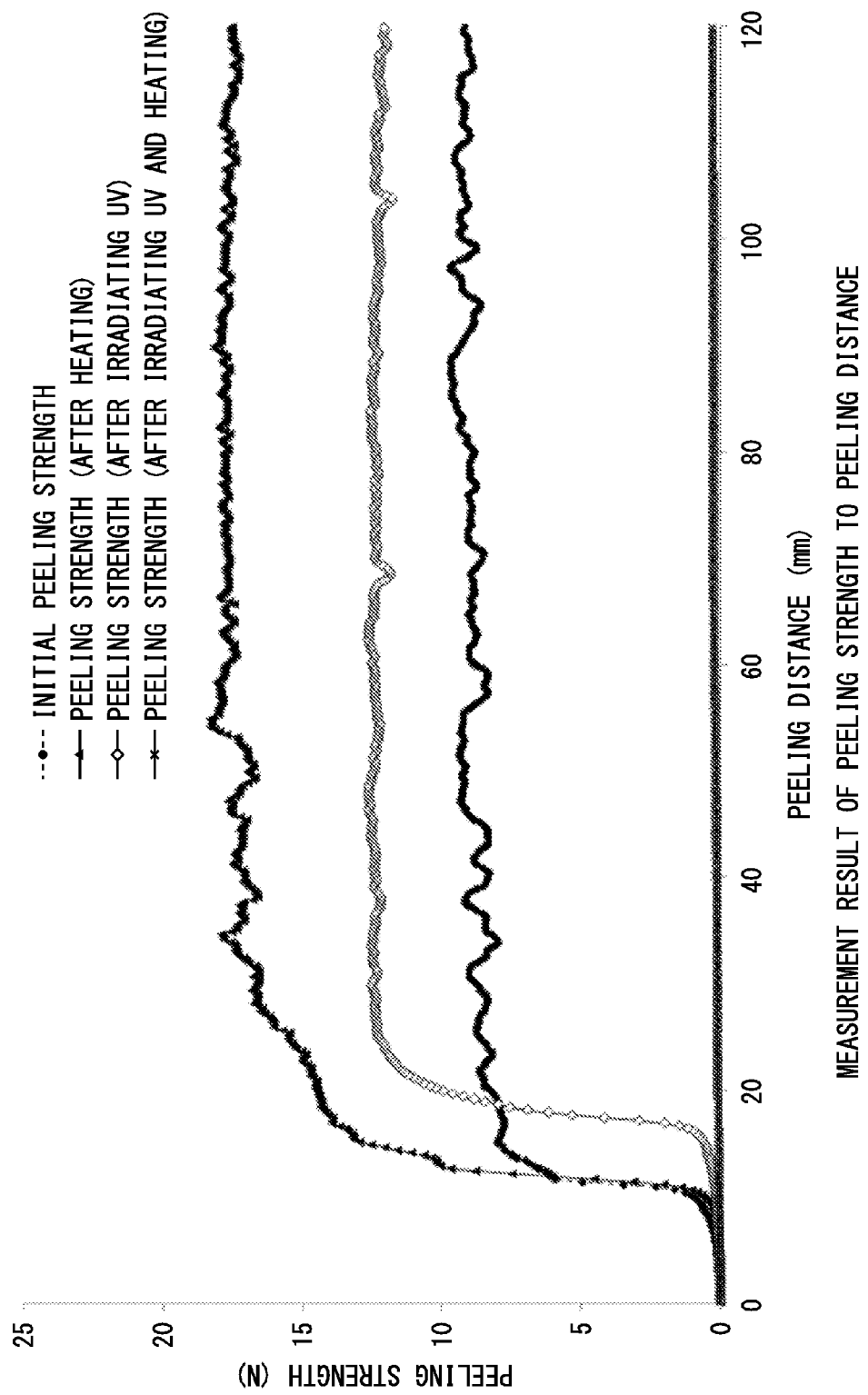
FIG. 1 shows the relationship between 180° peeling strength (N/20 mm) and peeling distance (mm/20 mm width) of an adhesive sheet before treatment, after heating or UV irradiation, and after both heating and UV irradiation in Example 1.

The acrylic polymer contained in the easily dismantlable adhesive composition of the present invention contains a (meth)acrylate monomer having a carboxyl precursor group, 2-ethyl hexyl acrylate, and a monomer having a polar group as a monomer. The acrylic polymer has the carboxyl precursor group derived from the (meth)acrylate monomer at side chain. The carboxyl precursor group is converted to a carboxyl group by an acid catalyst or an acid component of an acid generator which generates acid by light or heat from outside of the adhesive layer, and then becomes (meth)acrylic acid. The (meth)acrylic acid enhances cohesive force of the adhesive layer. In addition, when the (meth)acrylic acid is generated, foam is generated. Due to these, the adhesive strength of the adhesive layer is decreased. In addition, the acid component, which is generated by the external stimulation, decomposes the side chain. Due to this, the peeling properties of the adhesive layer are improved. Thereby, it is possible to suitably deassemble the adhesive layer.

Any carboxyl precursor groups can be used as long as it becomes a carboxyl group by acid. However, an ester group including a carboxyl group and an alkyl group having a secondary or tertiary carbon atom which easily detaches an olefin by acid. As a group other than the alkyl group having a secondary or tertiary carbon atom, a benzyl group or the like which can be easily detached under mild conditions can also be preferably used. Among the carboxyl precursor group which is detached when the side chain is decomposed, any group which is detached and generates gas such as alkylene, and alkane is more preferably used because it contributes the improvement of peeling properties of the adhesive layer and further excellent peeling properties can be obtained.

The structure unit of the carboxyl precursor group in the acrylic copolymer containing the (meth)acrylate monomer having a carboxyl precursor group is preferably shown be the following formula (1).

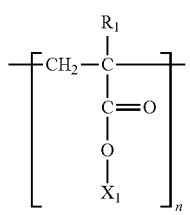

(1)

In the formula (1), $R_1$ represents a hydrogen atom or a methyl group, and preferably represents a hydrogen atom. $X_1$ represents an alkyl group (preferably having 1 to 20 carbon atom(s) and more preferably 1 to 12 carbon atom(s)) which is eliminated to form a carboxyl group in the formula (1) when influenced by an acid. In the case where $X_1$ represents an alkyl group having a secondary or tertiary carbon atom, an oxygen atom of a (meth)acryloyloxy group and the secondary or tertiary carbon atom of the alkyl group are bonded together.

Among the (meth)acrylate monomer having a carboxyl precursor groups, examples of an available (meth)acrylate monomer in which a secondary carbon atom of an alkyl group having a secondary carbon atom and a (meth)acryloyloxy group are bonded together include sec-butyl(meth)acrylate, isopropyl(meth)acrylate, sec-hexyl(meth)acrylate, sec-octyl (meth)acrylate, sec-nonyl(meth)acrylate, sec-decyl(meth) acrylate, bornyl(meth)acrylate, isobornyl(meth)acrylate, and cyclohexyl(meth)acrylate. Among them, cyclohexyl acrylate is preferably used, because favorable dismantling properties are easily exhibited, and a colorless adhesive layer having high transparency is easily formed.

Examples of an available (meth)acrylate monomer in which a tertiary carbon atom of an alkyl group having a tertiary carbon atom and a (meth)acryloyloxy group are bonded together include tert-butyl(meth)acrylate, tert-hexyl (meth)acrylate, tert-octyl(meth)acrylate, tert-nonyl(meth) acrylate, tert-decyl(meth)acrylate, and 2-alkyl-2-adamantyl (meth)acrylate such as 2-methyl-2-adamantyl(meth)acrylate.

As other (meth)acrylate monomer having a carboxyl precursor groups, benzyl(meth)acrylate may also be preferably used.

Among the (meth)acrylate monomers, tert-butyl(meth) acrylate, 2-methyl-2-adamantyl(meth)acrylate, 2-ethyl-2-adamantyl(meth)acrylate, bornyl(meth)acrylate, isobornyl (meth)acrylate, cyclohexyl(meth)acrylate, or benzyl(meth) acrylate is arbitrarily preferably selected to be used, because a carboxyl group is favorably formed by an acid in particular, and tert-butyl acrylate is particularly preferably used. In addition, isobornyl acrylate is particularly preferably used, because high thermal stability of the adhesive layer is realized in addition to favorable producibility of a carboxyl group by an acid, and a colorless adhesive layer having high transparency is easily formed.

Although an adhesive composition which dismantles when heated or exposed to ultraviolet may be preferably used as the adhesive composition according to the present invention, there is a case where an adhesive composition of which the adhesive strength is not significantly decreased when either heating or ultraviolet irradiation is solely conducted but is significantly decreased when both heating and ultraviolet irradiation are conducted is preferable when adhesion stabilities or the like are required. In such a case, the above-exemplified (meth)acrylate monomers in which a significant decrease in the adhesive strength is hardly caused by solely conducting either heating or ultraviolet irradiation, while a significant decrease in the adhesive strength is easily caused by conducting both heating and ultraviolet irradiation, are preferably used as the (meth)acrylate monomer having a carboxyl precursor group, and, among them, sec-butyl(meth) acrylate, isopropyl(meth)acrylate, cyclohexyl acrylate, isobornyl acrylate, bornyl acrylate, or tert-butyl acrylate is preferably used in particular.

The content of the (meth)acrylate monomer having a carboxyl precursor group in the total monomer constituting the acrylic polymer is preferably in the range of 1 to 75% by mass, because of capable to easily obtain suitable adhesive properties and dismantling properties, more preferably in the range of 1 to 60% by mass and 2 to 50% by mass, and most preferably in the range of 3 to 40% by mass.

In the present invention, suitable adhesive properties and dismantling properties can be obtained by using 2-ethyl hexyl acrylate and the monomer having a polar group together with the (meth)acrylate monomer having a carboxyl precursor group. Examples of the monomer having a polar group include a vinyl monomer having a hydroxyl group, carboxyl group, amino group, imino group, or amide group. These vinyl monomers are preferably used because it easily improves adhesive properties and cohesive force of the adhesive layer during dismantling due to the intermolecular interaction. Among these, the vinyl monomer having a polar group which can form hydrogen bond is preferable. The vinyl monomer having a hydroxyl group can improve adhesive properties, produce the adhesive layer having excellent temporal stability after adhesion, and easily maintain cohesive force of the adhesive layer during dismantling. Therefore, in particular, the vinyl monomer having a hydroxyl group is preferably used to dismantle the interface of an adherend/an adhesive layer, and an adhesive layer/a substrate. Thereby, suitable dismantling properties can be easily obtained.

Examples of the vinyl monomer having a hydroxyl group include 2-hydroxyethyl(meth)acrylate, 2-hydroxypropyl (meth)acrylate, 3-hydroxypropyl(meth)acrylate, 2-hydroxybutyl(meth)acrylate, 4-hydroxybutyl(meth)acrylate, 2-hydroxyhexyl(meth)acrylate, 6-hydroxyhexyl(meth)acrylate, 8-hydroxyoctyl(meth)acrylate, 10-hydroxydecyl(meth)acrylate, and 12-hydroxylauryl(meth)acrylate. In particular, 2-hydroxyethyl(meth)acrylate or 4-hydroxybutyl(meth)acrylate is more preferably used, and 2-hydroxyethyl(meth)acrylate is most preferably used.

In addition, examples of the vinyl monomer having a carboxyl group include acrylic acid, methacrylic acid, itaconic acid, maleic acid, crotonic acid, acrylic acid dimer, and ethylene oxide modified succinic acid acrylate.

Examples of the vinyl monomer having an amide group include acrylamide, methacrylamide, diethyl acrylamide, N-vinylpyrrolidone, N,N-dimethyl acrylamide, N,N-dimethyl methacylamide, N,N-diethyl acrylamide, N,N-diethyl methacrylamide, N,N'-methylene bisacrylamide, N,N-dimethyl aminopropyl acrylamide, N,N-dimethyl aminopropyl methacrylamide, and diacetone acrylamide. Examples of the vinyl monomer having an amino group include aminoethyl (meth)acrylate, N,N-dimethylamino ethyl(meth)acrylate, and N,N-dimethylaminopropyl(meth)acrylate.

Examples of the monomer having an imino group include cyclohexyl maleimide, isopropyl maleimide, N-cyclohexyl maleimide, and itaconimide.

The content of the 2-ethyl hexyl acrylate in the total monomer constituting the acrylic polymer is preferably 20% by mass or more, more preferably in the range of 30 to 95% by mass and 40 to 90% by mass, and most preferably in the range of 50 to 80% by mass, since excellent adhesive properties are easily obtained.

The content of the monomer having a polar group, preferably a vinyl monomer having a polar group, in the total monomer constituting the acrylic polymer is preferably in the range of 1 to 30% by mass, and 5 to 30% by mass, more preferably in the range of 8 to 25% by mass, and most preferably in the range of 10 to 20% by mass, since the adhesive strength can be improved, and suitable dismantling properties can obtained while maintaining high adhesive strength. In addition, it is possible to favorably peel the interface of the adhesive layer/an adherend and the adhesive layer/a substrate during dismantle process by adjusting the content of the monomer having a polar group to 5% by mass or more, preferably 8% by mass or more, and more preferably 10% by mass or more.

In the present invention, the acrylic polymer can include a monomer in addition to the monomers explained above. (Meth)acrylate having an alkyl group having a carbon number of 1 to 14 may be contained in addition to the (meth) acrylate monomer having a carboxyl precursor group and 2-ethyl hexyl acrylate. Examples of the (meth)acrylate having an alkyl group having a carbon number of 1 to 14 include methyl(meth)acrylate, ethyl(meth)acrylate, n-butyl(meth)acrylate, isobutyl(meth)acrylate, hexyl(meth)acrylate, 2-ethyl hexyl methacrylate, n-octyl(meth)acrylate, isooctyl (meth)acrylate, n-nonyl(meth)acrylate, isononyl(meth)acrylate, n-decyl(meth)acrylate, isodecyl(meth)acrylate, n-undecyl(meth)acrylate, n-dodecyl(meth)acrylate, n-tridecyl (meth)acrylate, and n-tetradecyl(meth)acrylate. In addition, monomer, such as styrene, and vinyl acetate may be used.

When a monomer is used in addition to the (meth)acrylate monomer having a carboxyl precursor group, 2-ethyl hexyl acrylate, and the monomer having a polar group, the content of the monomer is preferably the same or less as the content of 2-ethyl hexyl acrylate used, and preferably 20% by mass or less in the total monomer constituting the acrylic polymer, and more preferably 10% by mass or less.

The acrylic polymer used in the present invention may be a random polymer or a block polymer which includes the monomers explained above. It is preferable that the acrylic polymer be a random polymer, since the initial adhesive strength can be maintained. In contrast, when the acrylic polymer is a block polymer, and the adhesive layer is peeled off at the interface of an adherend/the adhesive layer, or the adhesive layer/a substrate, stick slip is not readily caused, and suitable dismantling properties are easily obtained. Therefore, block type acrylic polymer is also preferable. When the acrylic polymer is a block polymer polymer, it is preferable that the acrylic block polymer contain a poly(meth)acrylate chain (A) including the (meth)acrylate monomer having a carboxyl precursor group and a poly(meth)acrylate chain (B) including the 2-ethyl hexyl acrylate and the monomer having a polar group as a monomer component, since suitable adhesive strength and dismantling properties can be easily obtained. The block copolymer may be an AB type block copolymer including one poly(meth)acrylate chain (A) and one poly(meth)acrylate chain (B), and ABA type, BAB type, ABAB type, or ABABA type, etc in which plural poly (meth) acrylate chains (A) and plural poly(meth)acrylate chains (B) are randomly block polymerized. When the poly(meth)acrylate chain (A) is a polymer chain of which the number of the repeated unit of the (meth)acrylate monomer having a carboxyl precursor group is 10 or more, the side chain is decomposed by the acid catalyst or the acid generated by the acid generator which generates an acid component by heat or light from the outside of the adhesive layer, and this contributes to peel the adhesive layer. The number of the repeated unit is the number of the polymerizable unit. The number is not particularly limited as long as the acrylic polymer can provide adhesive properties. However, the number of the repeated unit is preferably 10 or more, and more preferably 20 or more. Upper limit thereof is preferably 100,000 or less.

When the acrylic polymer is a block copolymer including the poly(meth)acrylate chain (A) and the poly(meth)acrylate chain (B), the content of the chain (A) in the total content of the chains (A) and (B) in the acrylic polymer is preferably 75% by mole or less. The copolymerization ratio denoted by the molar ratio (chain (A)/chain (B)) is preferably in the range of 75/25 to 1/99, more preferably 65/35 to 3/97, and most preferably 50/50 to 10/90. In particular, the copolymerization ratio is preferably in the range of 40/60 to 15/85. When the polymerization ratio in the block copolymer is in the range, the suitable dismantling properties due to the poly(meth) acrylate chain (A) and the adhesive properties due to the poly(meth)acrylate chain (B) can be easily obtained.

The mass average molecular weight of the acrylic polymer used in the present invention call be adjusted to a range of about 10,000 to about 2,000,000 depending on embodiments of usage. When the acrylic polymer is produced by the living radical polymerization method explained below, the mass average molecular weight of the acrylic polymer is preferably in the range of about 10,000 to 100,000 in order to maintain high productivity, and preferably 150,000 or more, more preferably 300,000 or more, and most preferably in the range of about 450,000 to about 1,000,000 in order to maintain high adhesive strength before dismantling. In addition, in particular, when it is necessary to maintain the cohesive force of the adhesive layer during dismantling, the mass average molecular weight of the acrylic polymer is preferably 600,000 or more. When the number average molecular weight of the acrylic polymer is 150,000 or more, high adhesive strength and suitable dismantling properties are easily obtained, and this is preferable.

The mass average molecular weight and the number average molecular weight are determined by gel permeation chromatography (GPC) against polystyrene standards. Examples of the measurement conditions include: using HLC-8220GPC (manufactured by TOSHO CORPORATION) with a column under the name of TSKgel GMHXL (manufactured by TOSHO CORPORATION); setting the column temperature at 40° C.; using tetrahydrofuran as an eluent; setting the flow rate at 1.0 mL/minute; and using TSK standard polystyrene as the standard polystyrene.

A chain transfer agent may be used when polymerization is conducted, in order to adjust the molecular weight of the resultants. Examples of the chain transfer agent include well-known chain transfer agents, such as, laurylmercaptan, glycidylmercaptan, mercaptoacetic acid, 2-mercaptoethanol, thioglycolic acid, 2-ethylhexyl thioglycolate, 2,3-dimethylcapto-1-propanol, and the like.

The acrylic polymer may be prepared, for example, by subjecting a mixture of the above-mentioned acrylic monomers to radical polymerization reaction. Specific examples of the production process of the acrylic polymer include: a living radical polymerization technique; and well-known radical polymerization techniques conducted using an azo-based initiator or a peroxide. Among them, the radical polymerization techniques are preferably adopted, because occurrence of side reactions, such as chain transfer reaction or termination reaction, during a radical polymerization process, is prevented, and generation of low-molecular components is suppressed, and an acrylic polymer having a narrow molecular-weight-distribution is obtainable.

Examples of the living radical polymerization technique include: an atom transfer radical polymerization technique (ATRP method); a living radical polymerization technique conducted using an organic heterocompound containing an atom of group 15 or group 16 in the high periodic system as a catalyst (radical polymerization technique mediated by an organic heterocompound) (TERP method or the like); a nitroxide-mediated living radical polymerization method (NMP method), reversible addition-fragmentation chain-transfer polymerization (RAFT method), and the like.

The atom transfer radical polymerization technique (ATRP method) is a method, for example, in which the acrylic monomers are polymerized in the presence of both a transition metal complex and an organohalide.

Examples of an available transition metal composing the transition metal complex include: Cu, Ru, Fe, Rh, V, Ni, and halides thereof. Examples of a ligand to be coordinated with the transition metal include bipyridyl derivatives, mercaptan derivatives, trifluorate derivatives, tertiary alkylamine derivatives, and the like.

The organohalide is a polymerization initiator, and examples thereof include methyl 2-bromo (or chloro) propionate, ethyl 2-bromo (or chloro) propionate, methyl 2-bromo (or chloro)-2-methyl propionate, ethyl 2-bromo (or chloro)-2-methyl propionate, chloro (or bromo) 1-phenylethyl, 2-hydroxyethyl 2-bromo (or chloro) propionate, 4-hydroxybutyl 2-bromo (or chloro) propionate, 2-hydroxyethyl 2-bromo (or chloro)-2-methyl propionate, 4-hydroxybutyl 2-bromo (or chloro)-2-methyl propionate, and the like.

The radical polymerization technique mediated by an organic heterocompound is a method in which the acrylic monomers are polymerized in the presence of both an organic heterocompound and a radical initiator. The radical polymerization technique mediated by an organic heterocompound is preferably adopted, because the molecular weight of the acrylic copolymer is easily increased, and the adhesive strength is easily improved.

Examples of an organic heterocompound preferably used in the radical polymerization technique mediated by the organic heterocompound include organic tellurium compounds, organic ditelluride compounds, organic bismuth compounds, and organic antimony compounds. Specific examples of the organic heterocompound arbitrarily used include well-known compounds, such as, organic tellurium compounds and organic ditelluride compounds, disclosed in Japanese Patent Application Laid-Open No. 2004-323693, WO 2004/14818, Japanese Patent Application Laid-Open No. 2006-225524, Japanese Patent Application Laid-Open No. 2006-299278, Japanese Patent Application Laid-Open No. 2008-291216, Japanese Patent Application Laid-Open No. 2009-149877, or the like; organic bismuth compounds disclosed in Japanese Patent Application Laid-Open No. 2009-149877, WO 2006/62255, or the like; and organic antimony compounds disclosed in Japanese Patent Application Laid-Open No. 2009-149877, WO 2006/1496, or the like. More specific examples thereof include: methyl 2-methyltellanyl-2-methyl propionate, ethyl 2-methyltellanyl-2-methyl propionate, ethyl 2-n-butyl-2-phenyltellanyl propionate, ethyl 2-methyl-2-phenyltellanyl propionate, 2-methyltellanyl propionitrile, 2-methyl-2-methyltellanyl propionitrile, (methyltellanyl methyl)benzene, (1-methyltellanyl-ethyl)benzene, (2-methyltellanyl-propyl)benzene, (1-phenyltellanyl-ethyl)benzene, ethyl 2-methyl-2-n-butyltellanyl-propionate, 2-methyl-2-dimethylbismuthanyl propionic acid methyl ester, 2-methyl-2-diphenylbismuthanyl propionitrile, 2-methyl-2-dimethylphenylbismuthanyl propionitrile, methyl 2-methyl-2-dimethylstibanyl propionate, 2-methyl-2-dimethylstibanyl propionitrile, 1-dimethylstibanyl-1-phenylethane, dimethylditelluride, diethylditelluride, di-n-propylditelluride, diisopropylditelluride, dicyclopropylditelluride, di-n-butylditelluride, di-sec-butylditelluride, di-tert-butylditelluride, dicyclobutylditelluride, diphenylditelluride, bis-(p-methoxyphenyl)ditelluride, bis-(p-aminophenyl)ditelluride, bis-(p-nitrophenyl)ditelluride, bis-(p-cyanophenyl)ditelluride, bis-(p-sulfonylphenyl)ditelluride, dinaphthylditelluride, dipyridylditelluride, and the like. Compounds such as dimethylditelluride, diethylditelluride, di-n-propylditelluride, di-n-butylditelluride, diphenylditelluride, and the like, may be preferably exemplified.

The acrylic polymer may be prepared, for example, by polymerizing the (meth)acrylate monomer having a carboxyl precursor groups using the above-mentioned radical polymerization technique to form a poly(meth)acrylate chain (A) that is a homopolymer composed of the (meth)acrylate monomer having a carboxyl precursor group, followed by forming a poly(meth)acrylate chain (B) in the same manner as mentioned above, and then forming the bond between an acetylenic group and an azido group using a click reaction such as cycloaddition reaction, the acetylenic group and the azido group being introduced into the poly(meth)acrylate chains (A) and (B), respectively.

[Acid Catalyst and Acid Generator]

Examples of an acid catalyst arbitrarily selectable to be used in the present invention include: aromatic sulfonic acids, such as p-toluenesulfonic acid and benzenesulfonic acid; organic acids such as aliphatic sulfonic acids; inorganic acids such as hydrochloric acid and sulfuric acid; and hydrates thereof.

Examples of an acid generator used in the present invention include: photoacid generators, which generate acids upon exposure to photoradiation with an energy line such as ultraviolet, the acids having an ability to initiate cation polymerization; and thermal acid generators, which generate acids when heating is conducted. Among them, the photoacid generators are particularly preferably used, because the photoacid generators make it possible for an adhesive layer to be favorably dismantlable when exposed to two kinds of external stimuli, that is heat and light, while the photoacid generators, when used in an adhesive composition to be stored or in an adhesive tape to be used to fix members, make it possible to suppress easy disintegrating or dismantling thereof and maintain stable preservative qualities and adhesive properties thereof.

Examples of the photoacid generator arbitrarily available include n-hydroxy naphthalimide trifluoromethane sulfonic acid ester, n-hydroxy naphthalimide methane sulfonic acid ester, n-hydroxy naphthalimide benzene sulfonic acid ester, n-hydroxy naphthalimide triflate, bis(cyclohexylsulfonyl) diazo methane, bis(tert-butylsulfonyl)diazo methane, bis(p-toluenesulfonyl)diazo methane, triphenyl sulfonium trifluoromethane sulfonate, diphenyl-4-methylphenyl sulfonium trifluoromethane sulfonate, diphenyl-2,4,6-trimethyl phenyl sulfonium-p-toluene sulfonate, bis(dodecylphenyl)iodonium hexafluoroantimonate, bis(tert-butylphenyl)iodonium hexafluorophosphate, bis(tert-butylphenyl)iodonium trifluoromethane sulfonate, triphenylsulfonium trifluoromethane sulfonate, biphenyl iodonium trifluoromethane sulfonate, phenyl(3-hydroxypentadecylphenyl)iodonium hexafluoroantimonate, and phenyl(3-hydroxypentadecylphenyl)iodonium hexafluoroantimonat.

The photoacid generators may be arbitrarily selected depending on the intended use. For example, there is a case where the decomposition temperatures of the acid generators decrease when mixed with an adhesive agent, and therefore those having an inherent decomposition temperature of approximately at least 150° C., such as n-hydroxy naphthalimide trifluoromethane sulfonic acid ester or bis(cyclohexylsulfonyl)diazomethane, are preferably used, from the standpoint of preventability of: acid-generation influenced by heat when stored or the like; and progress of dismantling of an adhesive composition.

Among the photoacid generators, photoacid generators which generate gas when heating is conducted, such as bis (cyclohexylsulfonyl)diazomethane, are preferable, because particularly high dismantling properties are easily achieved, by generating: acid due to photoradiation; and gas due to heating. The photoacid generators which hardly generate gas even when heated at approximately 100° C., such as N-hydroxy naphthalimide trifluoromethane sulfonic acid ester, are preferable, because an adhesive layer having a high thermal stability can be formed.

Among the photoacid generators, the photoacid generators having a photoabsorbent structure in the skeleton thereof, such as a benzene ring or a naphthalene ring, are preferable, because favorable dismantling properties can be achieved even when the photoradiation time is brief or the content thereof is small, and thereby easily decreasing the production cost or dismantling cost. On the other hand, photoacid generators free from the photoabsorbent structure are preferably used when the stability against the photoradiation is required.

Examples of the thermal acid generator arbitrarily available include sulfonium salts, benzothiazonium salts, ammonium salts, and phosphonium salts, and specific examples thereof include 4-acetoxy phenyldimethylsulfonium hexafluoroarsenate, benzyl-4-hydroxyphenylmethylsulfonium hexafluoroantimonate, 4-acetoxy phenylbenzylmethylsulfonium hexafluoroantimonate, dibenzyl-4-hydroxyphenyl sulfonium hexafluoroantimonate, 4-acetoxy phenylbenzylsulfonium hexafluoroantimonate, and 3-benzylbenzothiazolium hexafluoroantimonate.

[Adhesive Composition]

The adhesive composition according to the present invention contains the acrylic polymer, and the acid catalyst or the acid generator. The adhesive layer made of the adhesive composition has excellent adhesive properties when it is attached not only at room temperature but also low temperatures. The adhesive properties of the acrylic polymer can be sufficiently realized. In the case of dismantling of the adhesive tape, when the adhesive tape is heated or irradiated with light in the presence of the acid catalyst or the acid generator which generates an acid component by heat or light from the outside of the adhesive layer, the carboxyl precursor group (preferably the secondary or tertiary carbon atom which is bonded with the (meth)acryloyloxy group) at the side chain of the polymer is decomposed. Thereby, the adhesive strength is largely decreased, and the adhesive tape is easily dismantlable.

Although the content of the acid catalyst or the acid generator in the adhesive composition may be arbitrarily determined depending on the kind of the acid catalyst or acid generator used, or intended dismantling properties, it is preferable that the content be 10% by mole or less, and particularly preferably within the range from 1 to 10% by mole, relative to 1 mole of the carboxyl precursor group in the (meth)acrylate having a carboxyl precursor group. Among them, in the case where the photoacid generator having a photoabsorbent structure is used, the content thereof is preferably approximately 0.1 to 5% by mole, and particularly preferably 0.1 to 3% by mole. On the other hand, in the case where the photoacid generator free from the photoabsorbent structure is used, the content thereof is preferably approximately 3 to 10% by mole, and particularly preferably 4 to 8% by mole.

It is preferable that the content of the acid catalyst or the acid generator be 15 parts by mass or less, relative to 100 parts by mass of the acrylic polymer. Among them, in the case where the photoacid generator having a photoabsorbent structure is used, the content thereof is preferably approximately 0.1 to 5 parts by mass, and particularly preferably 0.2 to 3 parts by mass, relative to 100 parts by mass of the acrylic polymer. On the other hand, in the case where the photoacid generator free from the photoabsorbent structure is used, the content thereof is preferably approximately 5 to 15 parts by mass, and particularly preferably 7 to 12 parts by mass, relative to 100 parts by mass of the acrylic polymer.

The adhesive composition according to the present invention is an acrylic adhesive composition containing an acrylic polymer as the main component thereof, and the adhesive composition may solely contain the above-mentioned acrylic polymer as the acrylic polymer, or further contain another acrylic polymer together therewith as the acrylic polymer. In addition, the adhesive composition may contain a tackifier resin, a cross-linker, another additive agent, or the like, as needed.

[Tackifier Resin]

The adhesive composition according to the present invention may contain a tackifier resin in order to adjust the high adhesive properties of the obtained adhesive layer. Examples of the tackifier resin available in the present invention include rosins, polymerized rosins, polymerized rosin esters, rosin phenols, stabilized rosin esters, dismutated rosin esters, terpenes, terpene phenols, and petroleum resins.

[Solvent]

The adhesive composition according to the present invention may contain a solvent conventionally used in an adhesive composition, and examples thereof include toluene, xylene, ethyl acetate, butyl acetate, acetone, methyl ethyl ketone, hexane, and the like. In the case of a water-based adhesive composition, water or an aqueous solvent containing water as the main component thereof may be used.

[Cross-Linker]

The adhesive composition according to the present invention preferably contains a cross-linker in order to improve a cohesive force of the obtained adhesive layer. Examples of the cross-linker include conventionally known isocyanate-based cross-linkers, epoxy-based cross-linkers, aziridine-based cross-linkers, multivalent metal salt-based cross-linkers, metallic chelate-based cross-linkers, keto-hydrazide-based cross-linkers, oxazoline-based cross-linkers, carbodiimide-based cross-linkers, silane-based cross-linkers, and glycidyl (alkoxy) epoxy silane-based cross-linkers.

[Additive Agent]

The adhesive composition according to the present invention may optionally contain known additive agents, such as, a base (such as ammonia water) or an acid to adjust the pH thereof, a foaming agent, a plasticizer, a softener, an antioxidant, a filler, such as a glass- or plastic-fiber, balloon, bead, or metallic powder, a colorant such as a pigment or dye, a pH adjuster, a film-forming aid, a leveling agent, a thickener, a water repellent agent, or an antifoamer, as needed, provided that intended effects of the present invention are achieved without being disturbed.

The foaming agent may be used to progress dismantling of the adhesive agent, and examples thereof include an inorganic foaming agent, an organic foaming agent, and thermally expandable hollow sphere, the volume of which being expanded when heating is conducted.

[Easily Dismantlable Adhesive Tape]

An easily dismantlable adhesive tape according to the present invention is an adhesive tape containing an adhesive layer made of the adhesive composition. The adhesive layer may be composed of a single adhesive layer or plural adhesive layers laminated. In addition, the adhesive tape may have a substrate or may be composed of only the adhesive layer(s) free from any substrates. In addition, the adhesive tape may be an adhesive tape having the adhesive layer(s) on one surface of a substrate or a double-faced adhesive tape having the adhesive layers on both surfaces of a substrate. In the case where the adhesive tape is used to fix at least two members, the adhesive tape composed of only the adhesive layer(s) or the double-faced adhesive tape is preferably used.

Examples of the substrate include: plastic film, formed of polyolefins (such as polypropylene or polyethylene), polyesters (such as polyethylene terephthalate or polyethylene naphthalate), polystyrenes, ABS, polycarbonate, polyimide film, polyvinyl chloride, nylon, polyvinyl alcohol, or the like; non-woven cloth, formed of pulp, rayon, Manila fiber, acrylonitrile, nylon, polyester, or the like; paper, cloth, metallic foil, and the like, and polyester-based film or non-woven cloth is preferably used, because such a use makes it easy to realize both removability and adhesive properties.

In addition, one surface or both surfaces of the substrate may be subjected to corona treatment, plasma treatment, anchorcoat treatment, or the like, for the purpose of improving the adhesiveness between the substrate and the adhesive layer.

In the case where the easily dismantlable adhesive tape according to the present invention includes a substrate, the adhesive tape may be prepared by a direct coating method in which the adhesive composition is directly coated on the substrate using a roll coater, a die coater, or the like, and then dried, and a separator is fixed thereon, or a transfer method in which the adhesive composition is coated on a separator, dried, and then transferred to the substrate. In the case where the adhesive tape is free from any substrates, the adhesive tape may be prepared by coating the adhesive composition on a separator, and then fixing another separator thereon.

The easily dismantlable adhesive tape according to the present invention preferably has an adhesive strength of at least 1 N/20 mm, more preferably 2 to 30 N/20 mm, and particularly preferably 3 to 20 N/20 mm, when the adhesive tape is prepared by coating and drying the easily dismantlable adhesive composition on a PET film having a thickness of 50 µm using an applicator having a gap of 8 milli-inch, and the adhesive strength is determined by pressure-bonding the adhesive tape on a SUS board by rolling a hand roller having a weight of 2 kg thereon back and forth under an environment with a temperature of 23° C. and a humidity of 50%, and then leaving the adhesive tape still for 1 hour, followed by peeling off the adhesive tape in a 180° direction at a rate of 30 mm/minute using a peeling tester. The easily dismantlable adhesive tape according to the present invention exhibits favorable dismantling properties, even if the adhesive tape exhibits a high adhesive strength when used to fix members.

(Dismantling Method)

The easily dismantlable adhesive tape according to the present invention favorably bonds with an adherend or fixes members therebetween when bonded, whereas the adhesive tape can be favorably peeled by external stimuli such as heat or light when dismantlable and peeled. Although the external stimuli such as heat or light may be arbitrarily adjusted depending on the acid catalyst or acid generator used, it is preferable that the adhesive tape be peeled under temperature, heat intensity, and light conditions, the conditions being not usually generated in bonding aspects.

In the case where the easily dismantlable adhesive tape according to the present invention contains the acid catalyst, heating of the adhesive tape makes it possible to promote the elimination reaction of the carboxyl precursor group and increase the fluidity in the adhesive layer, which allows the acid to favorably diffuse in the adhesive layer, and thereby realizing favorable dismantling of the adhesive tape. In the case where the adhesive tape contains the acid generator which generates an acid by heat or light, although the adhesive tape is favorably dismantlable by conducting photoradiation or heating to generate an acid, further heating in the presence of the acid, as needed, realizes more favorable dismantling of the adhesive tape due to the acid diffusion caused by further promotion of the elimination reaction of the carboxyl precursor group and an increase in the fluidity of the adhesive layer. In particular, it is preferable in the present invention that the photoacid generator be used to generate an acid having an ability to dismantle the adhesive agent by being exposed to light such as ultraviolet and heating be conducted to efficiently progress dismantling of the adhesive agent due to the generated acid.

The photointensity of ultraviolet or the like may be at least an energy which allows the photoacid generator used to favorably generate an acid, and the heating temperature may be at least a temperature which allows the thermal acid generator to favorably generate an acid. The heating temperature in the presence of an acid may be adjusted to a temperature at which the fluidity in the adhesive layer is increased, depending on the glass transition temperature of the adhesive composition, to efficiently diffuse the acid, or a temperature at which the elimination reaction of carboxyl precursor groups is promoted to efficiently decompose side chains thereof.

The easily dismantlable adhesive tape according to the present invention has removability which enables an easy dismantling thereof when exposed to external stimuli, such as heat or light, to remove defects in adhesion at a working process or separate members at a recycling process. Accordingly, the adhesive tape is preferably used to fix members of various products in industrial applications, such as automobiles, building-products, office automation equipment, home electronics, or the like.

EXAMPLES

Preparation Example 1

Synthesis of Poly T-Butyl Acrylate (1)

A mixture solution of 0.86 mg of 2,2'-azobis(4-methoxy-2,4-dimethyl valeronitrile) (AMVN), 1.46 g of t-butyl acrylate (tBA), and 1.46 g of ethyl acetate was poured in a test tube, and any gas existing therein was expelled by conducting argon gas bubbling for 30 minutes. 3.19 µL of an organic monotellurium compound was added in the test tube using a microsyringe. Then the mixture was reacted in an oil bath at 50° C. for 2 hours. Thereby, a reaction solution of poly t-butyl acrylate (1) was produced. As a result of 1H-NMR (300 MHz) analysis thereof, the polymerization rate was 79%. In addition, according to the GPC analysis, Mn was 73, 800, and PD (Mw/Mn) was 1.28.

Synthesis of an Acrylic Block Copolymer (1):

Into the reaction solution of the poly t-butyl acrylate (1) produced in Synthesis of poly t-butyl acrylate, a mixture solution of 4.48 g of 2-ethyl hexyl acrylate (2EHA), 0.82 g of 2-hydroxyethyl acrylate (HEA), and 5.30 g of ethyl acetate, which had already been bubbled with argon gas for 30 minutes, was added and reacted at 50° C. for 7 hours. As a result of 1H-NMR (300 MHz) analysis thereof, the polymerization rate of t-butyl acrylate, 2-ethyl hexyl acrylate, and 2-hydroxyethyl acrylate was 82%, 49%, and 58% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (1) was obtained. According to GPC analysis, Mn was 265,000, Mw was 462,000, and PD was 1.74. The mass ratio (tBA/2EHA/HEA) of the components in the copolymer obtained was 29.0/56.9/14.1.

Preparation Example 2

Synthesis of Poly T-Butyl Acrylate (2)

A mixture solution of 0.93 mg of 2,2'-azobis(4-methoxy-2,4-dimethyl valeronitrile) (AMVN), 1.71 g of t-butyl acrylate (tBA), and 3.42 g of ethyl acetate was poured in a test tube, and any gas existing therein was expelled by conducting argon gas bubbling for 30 minutes. 3.43 µL of an organic monotellurium compound was added in the test tube using a microsyringe. Then the mixture was reacted in an oil bath at 50° C. for 2 hours. Thereby, a reaction solution of poly t-butyl acrylate (2) was produced. As a result of 1H-NMR (300 MHz) analysis thereof, the polymerization rate was 76%. In addition, according to the GPC analysis, Mn was 93, 200, and PD was 1.30.

Synthesis of an Acrylic Block Copolymer (2):

Into the reaction solution of the poly t-butyl acrylate (2) produced in Synthesis of poly t-butyl acrylate, 5.66 g of 2-ethyl hexyl acrylate (2EHA) and 0.23 g of 2-hydroxyethyl acrylate (HEA), which had already been bubbled with argon gas for 30 minutes, were added and reacted at 50° C. for 4 hours. As a result of 1H-NMR (300 MHz) analysis thereof, the polymerization rate of t-butyl acrylate, 2-ethyl hexyl acrylate, and 2-hydroxyethyl acrylate was 87%, 46%, and 52% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, acrylic block copolymer (2) was obtained. According to GPC analysis, Mn was 257,800, Mw was 383,000, and PD was 1.49. The mass ratio (tBA/2EHA/HEA) of the components in the copolymer obtained was 35.3/61.5/3.2.

Preparation Example 3

Synthesis of Poly T-Butyl Acrylate (3)

A mixture solution of 0.96 mg of 2,2'-azobis(4-methoxy-2,4-dimethyl valeronitrile) (AMVN), 1.89 g of t-butyl acrylate (tBA), and 3.11 g of n-butyl acrylate (nBA), 0.65 g of 2-hydroxy ethyl acrylate (HEA), and 5.65 g of ethyl acetate was poured in a test tube, and any gas existing therein was expelled by conducting argon gas bubbling for 30 minutes. 3.56 µL of an organic monotellurium compound was added in the test tube using a microsyringe. Then the mixture was reacted in an oil bath at 50° C. for 4 hours. As a result of 1H-NMR (300 MHz) analysis thereof, the polymerization rate of t-butyl acrylate, n-butyl acrylate, and 2-hydroxyethyl acrylate was 77%, 76%, and 79% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, acrylic random copolymer (1) was obtained. According to GPC analysis, Mn was 253,400, Mw was 475,000, and PD was 1.88. The mass ratio (tBA/nBA/HEA) of the components in the copolymer obtained was 33.5/53.7/12.8.

Preparation Example 4

Synthesis of Poly T-Butyl Acrylate (4)

A mixture solution of 1.23 mg of 2,2'-azobis(4-methoxy-2,4-dimethyl valeronitrile) (AMVN), 1.89 g of t-butyl acrylate (tBA), and 3.29 g of n-butyl acrylate (nBA), 0.16 g of 2-hydroxy ethyl acrylate (HEA), and 2.05 g of ethyl acetate was poured in a test tube, and any gas existing therein was expelled by conducting argon gas bubbling for 30 minutes. 4.55 µL of an organic monotellurium compound was added in the test tube using a microsyringe. Then the mixture was reacted in an oil bath at 50° C. for 5 hours. As a result of 1H-NMR (300 MHz) analysis thereof, the polymerization rate of t-butyl acrylate, n-butyl acrylate, and 2-hydroxyethyl acrylate was 91%, 90%, and 90% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, acrylic random copolymer (2) was obtained. According to GPC analysis, Mn was 277,100, Mw was 463,000, and PD was 1.67. The mass ratio (tBA/nBA/HEA) of the components in the copolymer obtained was 35.5/61.1/3.4.

Preparation Example 5

Synthesis of Poly T-Butyl Acrylate (3)

A mixture solution of 1.21 mg of 2,2'-azobis(4-methoxy-2,4-dimethyl valeronitrile) (AMVN), 1.33 g of t-butyl acrylate (tBA), and 2.66 g of ethyl acetate was poured in a test tube, and any gas existing therein was expelled by conducting argon gas bubbling for 30 minutes. 4.49 μL of an organic monotellurium compound was added in the test tube using a microsyringe. Then the mixture was reacted in an oil bath at 50° C. for 2 hours. Thereby, a reaction solution of poly t-butyl acrylate (3) was produced. As a result of 1H-NMR (300 MHz) analysis thereof, the polymerization rate was 79%. In addition, according to the GPC analysis, Mn was 73,800, and PD was 1.26.

Synthesis of an Acrylic Block Copolymer (3):

Into the reaction solution of the poly t-butyl acrylate (3) produced in Synthesis of poly t-butyl acrylate, a mixture solution of 5.90 g of n-butyl acrylate (nBA) and 1.16 g of 2-hydroxyethyl acrylate (HEA), which had already been bubbled with argon gas for 30 minutes, was added and reacted at 50° C. for 3 hours. As a result of 1H-NMR (300 MHz) analysis thereof, the polymerization rate of t-butyl acrylate, 2-hydroxyethyl acrylate, and n-butyl acrylate was 90%, 42%, and 49% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (3) was obtained. According to GPC analysis, Mn was 266,300, Mw was 570,000, and PD was 2.14. The mass ratio (tBA/nBA/HEA) of the components in the copolymer obtained was 33.2/53.1/13.7.

Preparation Example 6

Synthesis of Poly T-Butyl Acrylate (4)

A mixture solution of 1.15 mg of 2,2'-azobis(4-methoxy-2,4-dimethyl valeronitrile) (AMVN), 1.48 g of t-butyl acrylate (tBA), and 2.95 g of ethyl acetate was poured in a test tube, and any gas existing therein was expelled by conducting argon gas bubbling for 30 minutes. 4.25 μL of an organic monotellurium compound was added in the test tube using a microsyringe. Then the mixture was reacted in an oil bath at 50° C. for 2 hours. Thereby, a reaction solution of poly t-butyl acrylate (4) was produced. As a result of 1H-NMR (300 MHz) analysis thereof, the polymerization rate was 74%. In addition, according to the GPC analysis, Mn was 68,600, and PD was 1.32.

Synthesis of an Acrylic Block Copolymer (4):

Into the reaction solution of the poly t-butyl acrylate (4) produced in Synthesis of poly t-butyl acrylate, a mixture solution of 5.76 g of n-butyl acrylate (nBA) and 0.23 g of 2-hydroxyethyl acrylate (HEA), which had already been bubbled with argon gas for 30 minutes, was added and reacted at 50° C. for 12 hours. As a result of 1H-NMR (300 MHz) analysis thereof, the polymerization rate of t-butyl acrylate, n-butyl acrylate, and 2-hydroxyethyl acrylate was 90%, 60%, and 62% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (4) having a poly t-butyl acrylate chain and another polyacrylate chain made of other copolymer components was obtained. According to GPC analysis, Mn was 239,200, Mw was 354,000, and PD was 1.48. The mass ratio (tBA/nBA/HEA) of the components in the copolymer obtained was 29.2/67.2/3.6.

Preparation Example 7

Synthesis of Poly T-Butyl Acrylate (7)

A mixture solution of 0.49 mg of 2,2'-azobis(4-methoxy-2,4-dimethyl valeronitrile) (AMVN), 1.00 g of t-butyl acrylate (tBA), 1.63 g of 2-ethyl hexyl acrylate (2EHA), 0.40 g of 2-hydroxy ethyl (HEA), and 3.01 g of ethyl acetate was poured in a test tube, and any gas existing therein was expelled by conducting argon gas bubbling for 30 minutes. 1.83 μL of an organic monotellurium compound was added in the test tube using a microsyringe. Then the mixture was reacted in an oil bath at 50° C. for 2 hours. As a result of 1H-NMR (300 MHz) analysis thereof, the polymerization rate of t-butyl acrylate, 2-hydroxyeethyl hexyl acrylate, and 2-hydroxyethyl acrylate was 77%, 73%, and 81% respectively.

After the completion of the reaction, the polymerization solution was diluted with 20 mL of chloroform, poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, acrylic random copolymer (3) was obtained. According to GPC analysis, Mn was 285,700, and PD was 2.03. The mass ratio (tBA/2EHA/HEA) of the components in the copolymer obtained was 33.2/51.9/14.9.

Preparation Example 8

A mixture solution of 2.68 mg of 2,2'-azobis(isobutylonitrile) (AIBN), 0.82 g of t-butyl acrylate (tBA), 1.39 g of 2-ethyl hexyl acrylate (2EHA), 0.29 g of 2-hydroxyethyl acrylate (HEA), and 5.00 g of toluene was poured in a test tube, and any gas existing therein was expelled by conducting argon gas bubbling for 30 minutes. Then the mixture was reacted in an oil bath at 60° C. for 3 hours. As a result of 1H-NMR (300 MHz) analysis thereof, the polymerization rate of t-butyl acrylate, 2-ethyl hexyl acrylate, and 2-hydroxyethyl acrylate was 64%, 59%, and 79% respectively.

After the completion of the reaction, the polymerization solution was diluted with 20 mL of chloroform, poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, acrylic random copolymer (4) was obtained. According to GPC analysis, Mn was 149,700, and PD was 2.23. The mass ratio (tBA/2EHA/HEA) of the components in the copolymer obtained was 32.6/51.2/16.2.

Preparation Example 9

Synthesis of Poly T-Butyl Acrylate (5)

A mixture solution of 0.74 mg of 2,2'-azobis(4-methoxy-2,4-dimethyl valeronitrile) (AMVN), 1.28 g of t-butyl acrylate (tBA), and 1.28 g of ethyl acetate was poured in a test tube, and any gas existing therein was expelled by conducting argon gas bubbling for 30 minutes. 2.74 µL of an organic monotellurium compound was added in the test tube using a microsyringe. Then the mixture was reacted in an oil bath at 50° C. for 2 hours. Thereby, a reaction solution of poly t-butyl acrylate (5) was produced. As a result of 1H-NMR (300 MHz) analysis thereof, the polymerization rate was 69%. In addition, according to the GPC analysis, Mn was 65,600, and PD was 1.29.

Synthesis of an Acrylic Block Copolymer (5):

Into the reaction solution of the poly t-butyl acrylate (5) produced in Synthesis of poly t-butyl acrylate, a mixture solution of 4.33 g of 2-ethyl hexyl acrylate (2EHA) and 0.47 g of 2-hydroxyethyl acrylate (HEA), which had already been bubbled with argon gas for 30 minutes, was added and reacted at 50° C. for 4 hours. As a result of 1H-NMR (300 MHz) analysis thereof, the polymerization rate of t-butyl acrylate, 2-ethyl hexyl acrylate, and 2-hydroxyethyl acrylate was 83%, 42%, and 49% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (5) having a poly t-butyl acrylate chain and another polyacrylate chain made of other copolymer components was obtained. According to GPC analysis, Mn was 187,900, Mw was 268,200, and PD was 1.43. The mass ratio (tBA/2EHA/HEA) of the components in the copolymer obtained was 33.5/58.4/8.1.

Preparation Example 10

Synthesis of Poly T-Butyl Acrylate (6)

A mixture solution of 0.68 mg of 2,2'-azobis(4-methoxy-2,4-dimethyl valeronitrile) (AMVN), 1.31 g of t-butyl acrylate (tBA) and 2.61 g of ethyl acetate was poured in a test tube, and any gas existing therein was expelled by conducting argon gas bubbling for 30 minutes. 2.53 µL of an organic monotellurium compound was added in the test tube using a microsyringe. Then the mixture was reacted in an oil bath at 50° C. for 2.5 hours. Thereby, a reaction solution of poly t-butyl acrylate (6) was produced. As a result of 1H-NMR (300 MHz) analysis thereof, the polymerization rate was 68%. In addition, according to the GPC analysis, Mn was 73,700, and PD was 1.28.

Synthesis of an Acrylic Block Copolymer (6):

Into the reaction solution of the poly t-butyl acrylate (6) produced in Synthesis of poly t-butyl acrylate, a mixture solution of 4.45 g of 2-ethyl hexyl acrylate (2EHA), and 0.36 g of 2-hydroxyethyl acrylate (HEA), which had already been bubbled with argon gas for 30 minutes, was added and reacted at 50° C. for 4 hours. As a result of 1H-NMR (300 MHz) analysis thereof, the polymerization rate of t-butyl acrylate, 2-ethyl hexyl acrylate, and 2-hydroxyethyl acrylate was 85%, 45%, and 50% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (6) having a poly t-butyl acrylate chain and another polyacrylate chain made of other copolymer components was obtained. According to GPC analysis, Mn was 203,600, Mw was 302,900, and PD was 1.49. The mass ratio (tBA/2EHA/HEA) of the components in the copolymer obtained was 32.9/61.3/5.8.

Preparation Example 11

Synthesis of Poly T-Butyl Acrylate (7)

A mixture solution of 0.97 mg of 2,2'-azobis(4-methoxy-2,4-dimethyl valeronitrile) (AMVN), 1.67 g of t-butyl acrylate (tBA) and 3.34 g of ethyl acetate was poured in a test tube, and any gas existing therein was expelled by conducting argon gas bubbling for 30 minutes. 3.59 µL of an organic monotellurium compound was added in the test tube using a microsyringe. Then the mixture was reacted in an oil bath at 50° C. for 2 hours. Thereby, a reaction solution of poly t-butyl acrylate (7) was produced. As a result of 1H-NMR (300 MHz) analysis thereof, the polymerization rate was 73%. In addition, according to the GPC analysis, Mn was 61,900, and PD was 1.26.

Synthesis of an Acrylic Block Copolymer (7):

Into the reaction solution of the poly t-butyl acrylate (7) produced in Synthesis of poly t-butyl acrylate, a mixture solution of 5.66 g of 2-ethyl hexyl acrylate (2EHA) and 0.62 g of 2-hydroxyethyl acrylate (HEA), which had already been bubbled with argon gas for 30 minutes, was added and reacted at 50° C. for 6 hours. As a result of 1H-NMR (300 MHz) analysis thereof, the polymerization rate of t-butyl acrylate, 2-ethyl hexyl acrylate, and 2-hydroxyethyl acrylate was 81%, 34%, and 42% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (7) having a polyacrylate chain made of poly t-butyl acrylate chain and other copolymer components was obtained. According to GPC analysis, Mn was 140,200, Mw was 196,400, and PD was 1.40. The mass ratio (tBA/2EHA/HEA) of the components in the copolymer obtained was 38.5/54.0/7.6.

Preparation Example 12

Synthesis of Poly T-Butyl Acrylate (8)

A mixture solution of 0.73 mg of 2,2'-azobis(4-methoxy-2,4-dimethyl valeronitrile) (AMVN), 0.82 g of t-butyl acrylate (tBA) and 1.64 g of ethyl acetate was poured in a test tube, and any gas existing therein was expelled by conducting argon gas bubbling for 30 minutes. 2.71 μL of an organic monotellurium compound was added in the test tube using a microsyringe. Then the mixture was reacted in an oil bath at 50° C. for 2 hours. Thereby, a reaction solution of poly t-butyl acrylate (8) was produced. As a result of 1H-NMR (300 MHz) analysis thereof, the polymerization rate was 72%. In addition, according to the GPC analysis, Mn was 43,100, and PD was 1.26.

Synthesis of an Acrylic Block Copolymer (8):

Into the reaction solution of the poly t-butyl acrylate (8) produced in Synthesis of poly t-butyl acrylate, a mixture solution of 5.20 g of 2-ethyl hexyl acrylate (2EHA) and 0.96 g of 2-hydroxyethyl acrylate (HEA), which had already been bubbled with argon gas for 30 minutes, was added and reacted at 50° C. for 4 hours. As a result of 1H-NMR (300 MHz) analysis thereof, the polymerization rate of t-butyl acrylate, 2-ethyl hexyl acrylate, and 2-hydroxyethyl acrylate was 81%, 46%, and 57% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (8) having a poly t-butyl acrylate chain and another polyacrylate chain made of other copolymer components was obtained. According to GPC analysis, Mn was 215,000, Mw was 357,500, and PD was 1.66. The mass ratio (tBA/2EHA/HEA) of the components in the copolymer obtained was 17.0/66.5/16.5.

Preparation Example 13

Synthesis of Poly T-Butyl Acrylate (9)

A mixture solution of 0.77 mg of 2,2'-azobis(4-methoxy-2,4-dimethyl valeronitrile) (AMVN), 0.35 g of t-butyl acrylate (tBA) and 1.40 g of ethyl acetate was poured in a test tube, and any gas existing therein was expelled by conducting argon gas bubbling for 30 minutes. 2.84 μL of an organic monotellurium compound was added in the test tube using a microsyringe. Then the mixture was reacted in an oil bath at 50° C. for 2 hours. Thereby, a reaction solution of poly t-butyl acrylate (9) was produced. As a result of 1H-NMR (300 MHz) analysis thereof, the polymerization rate was 50%. In addition, according to the GPC analysis, Mn was 15,700, and PD was 1.21.

Synthesis of an Acrylic Block Copolymer (9):

Into the reaction solution of the poly t-butyl acrylate (9) produced in Synthesis of poly t-butyl acrylate, a mixture solution of 6.13 g of 2-ethyl hexyl acrylate (2EHA) and 1.28 g of 2-hydroxyethyl acrylate (HEA), which had already been bubbled with argon gas for 30 minutes, was added and reacted at 50° C. for 6 hours. As a result of 1H-NMR (300 MHz) analysis thereof, the polymerization rate of t-butyl acrylate, 2-ethyl hexyl acrylate, and 2-hydroxyethyl acrylate was 62%, 42%, and 58% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (9) having a polyacrylate chain made of poly t-butyl acrylate chain and other copolymer components was obtained. According to GPC analysis, Mn was 253,000, Mw was 394,700, and PD was 1.56. The mass ratio (tBA/2EHA/HEA) of the components in the copolymer obtained was 3.9/72.9/23.3.

Preparation Example 14

Synthesis of Poly T-Butyl Acrylate (10)

A mixture solution of 2.28 mg of 2,2'-azobis(4-methoxy-2,4-dimethyl valeronitrile) (AMVN), 0.89 mg of 2,2'-azobis(isobutylnitrile) (AIBN), 2.16 mg of diphenyl ditelluride (DPDT), 1.30 g of t-butyl acrylate (tBA) and 2.60 g of ethyl acetate was poured in a test tube, and any gas existing therein was expelled by conducting argon gas bubbling for 30 minutes. Then the mixture was reacted in an oil bath at 60° C. for 2.5 hours. Thereby, a reaction solution of poly t-butyl acrylate (10) was produced. As a result of 1H-NMR (300 MHz) analysis thereof, the polymerization rate was 64%. In addition, according to the GPC analysis, Mn was 61,500, and PD was 1.58.

Synthesis of an Acrylic Block Copolymer (10):

Into the reaction solution of the poly t-butyl acrylate (10) produced in Synthesis of poly t-butyl acrylate, a mixture solution of 4.29 g of 2-ethyl hexyl acrylate (2EHA) and 0.27 g of 2-hydroxyethyl acrylate (HEA), which had already been bubbled with argon gas for 30 minutes, was added and reacted at 60° C. for 3 hours. As a result of 1H-NMR (300 MHz) analysis thereof, the polymerization rate of t-butyl acrylate, 2-ethyl hexyl acrylate, and 2-hydroxyethyl acrylate was 83%, 49%, and 63% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (10) having a poly t-butyl acrylate chain and another polyacrylate chain made of other copolymer components was obtained. According to GPC analysis, Mn was 204,000, Mw was 371,300, and PD was 1.82. The mass ratio (tBA/2EHA/HEA) of the components in the copolymer obtained was 29.5/64.4/6.1.

Preparation Example 15

Synthesis of Poly T-Butyl Acrylate (11)

A mixture solution of 0.74 mg of 2,2'-azobis(4-methoxy-2,4-dimethyl valeronitrile) (AMVN), 1.26 g of t-butyl acrylate (tBA) and 2.52 g of ethyl acetate was poured in a test tube, and any gas existing therein was expelled by conducting argon gas bubbling for 30 minutes. 2.75 µL of an organic monotellurium compound was added in the test tube using a microsyringe. Then the mixture was reacted in an oil bath at 50° C. for 2.5 hours. Thereby, a reaction solution of poly t-butyl acrylate (11) was produced. As a result of 1H-NMR (300 MHz) analysis thereof, the polymerization rate was 75%. In addition, according to the GPC analysis, Mn was 68,600, and PD was 1.28.

Synthesis of an Acrylic Block Copolymer (11):

Into the reaction solution of the poly t-butyl acrylate (11) produced in Synthesis of poly t-butyl acrylate, a mixture solution of 4.23 g of 2-ethyl hexyl acrylate (2EHA) and 1.16 g of 4-hydroxybuthyl acrylate (HBA), which had already been bubbled with argon gas for 30 minutes, was added and reacted at 50° C. for 3 hours. As a result of 1H-NMR (300 MHz) analysis thereof, the polymerization rate of t-butyl acrylate, 2-ethyl hexyl acrylate, and 4-hydroxybuthyl acrylate was 86%, 44%, and 46% respectively.

After the completion of the reaction, the polymerization solution was poured in an aqueous solution including methanol and water (volume rate between methanol and water (methanol:water) is 80:20), the obtained polymer was precipitated, and the supernatant liquid was removed by decantation. The obtained precipitate was dissolved in 50 mL of chloroform, poured in the aqueous solution including methanol and water (volume rate between methanol and water (methanol:water) is 80:20), and the polymer was precipitated again. After removing the supernatant liquid by decantation, the precipitate was vacuum dried under reduced pressure, at 40° C., for 10 hours. Thereby, an acrylic block copolymer (11) having a poly t-butyl acrylate chain and another polyacrylate chain made of other copolymer components was obtained. According to GPC analysis, Mn was 192,500, Mw was 321,600, and PD was 1.67. The mass ratio (tBA/2EHA/HBA) of the components in the copolymer obtained was 30.3/53.6/16.1.

Example 1

Into the acrylic block copolymer (1) obtained in the Preparation Example 1, 0.4% by mole of N-hydroxynaphthalimido triflate (NIT) relative to the t-butyl group of the acrylic block copolymer (1) was added as the photoacid generator. Then, the mixture wad diluted with aceton, and thereby the adhesive composition containing 15% by weight acetone was obtained. The adhesive composition obtained was coated on a PET film having a thickness of 50 µm using an applicator having a gap of 8 milli-inch, drying under reduced pressure for 12 hours, and thereby an adhesive sheet was produced. The dismantling properties and adhesive properties of the adhesive sheet produced were evaluated in accordance with the following dismantling properties test and adhesive properties test. The results are shown in Table 1 and FIG. 1.

Example 2

Figure 2:
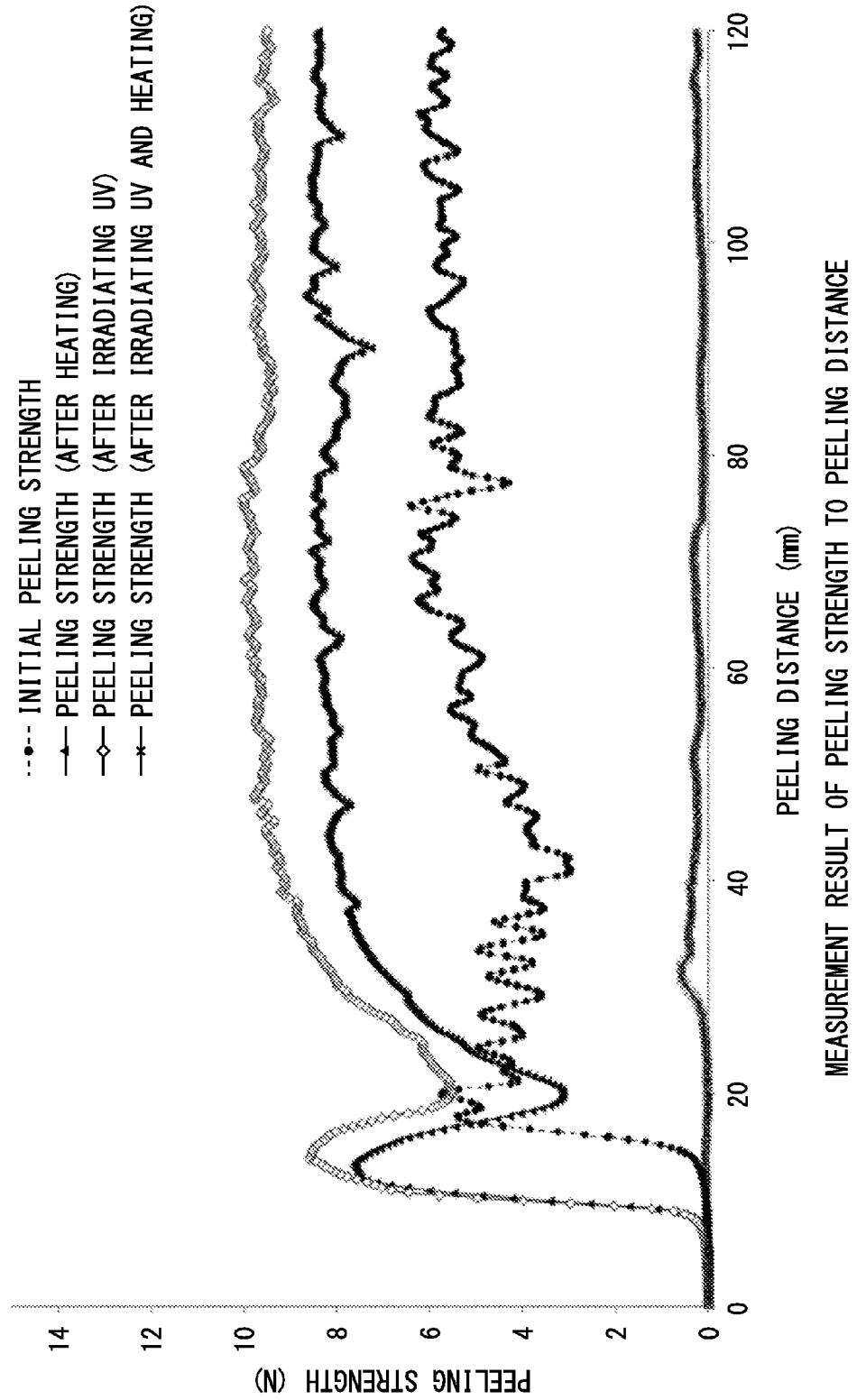
FIG. 2 shows the relationship between 180° peeling strength (N/20 mm) and peeling distance (mm/20 mm width) of an adhesive sheet before treatment, after heating or UV irradiation, and after both heating and UV irradiation in Example 2.

An adhesive sheet was produced and the dismantling properties and the adhesive properties thereof were evaluated in a manner identical to that of Example 1, except that the acrylic block copolymer (2) prepared in the Preparation Example 2 was used instead of the acrylic block copolymer (1). The evaluation results are shown in Table 1 and FIG. 2.

Example 3

Figure 3:
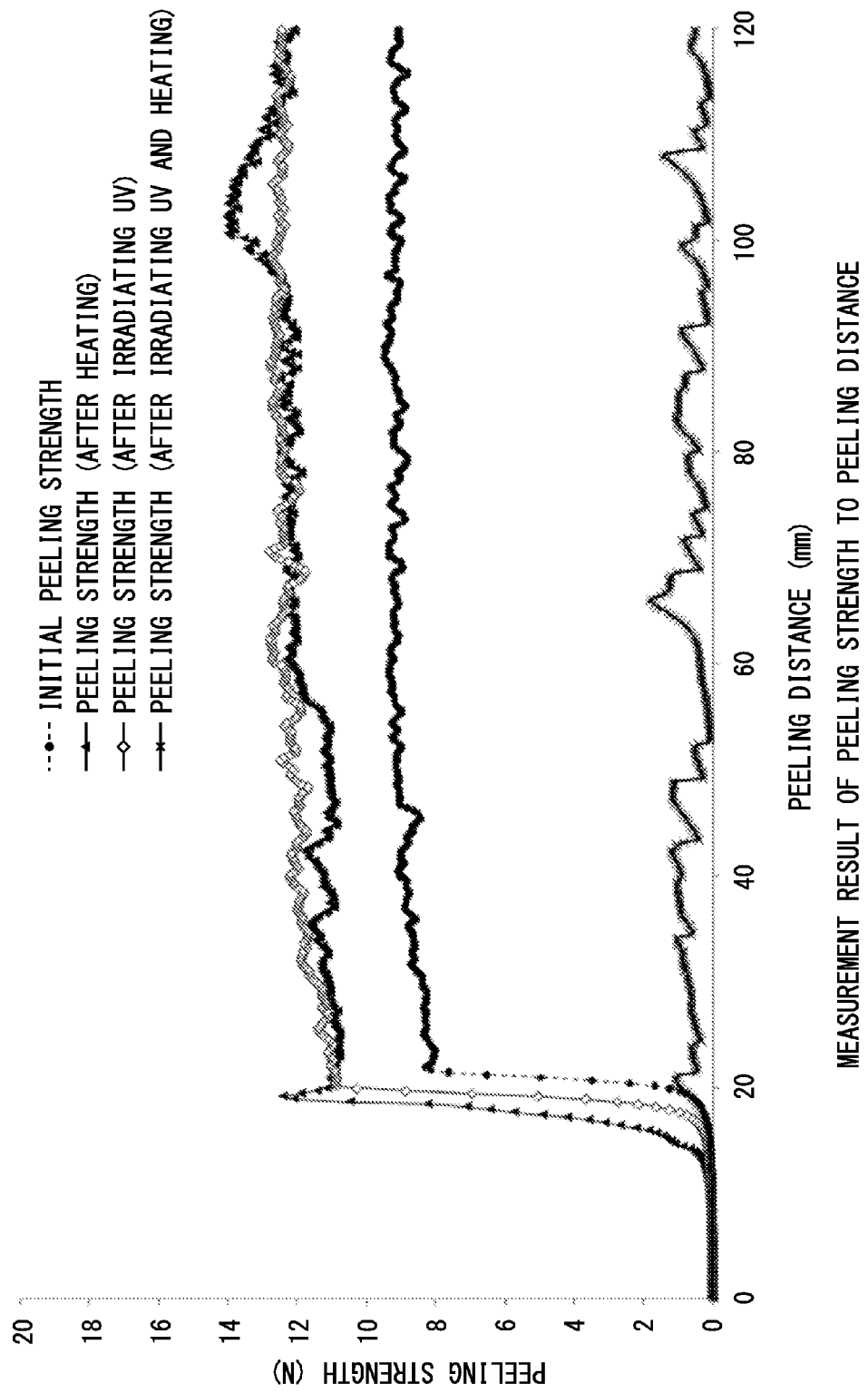
FIG. 3 shows the relationship between 180° peeling strength (N/20 mm) and peeling distance (mm/20 mm width) of an adhesive sheet before treatment, after heating or UV irradiation, and after both heating and UV irradiation in Example 3.

An adhesive sheet was produced and the dismantling properties and the adhesive properties thereof were evaluated in a manner identical to that of Example 1, except that the acrylic random copolymer (3) prepared in the Preparation Example 7 was used instead of the acrylic block copolymer (1). The evaluation results are shown in Table 1 and FIG. 3.

Example 4

Figure 4:
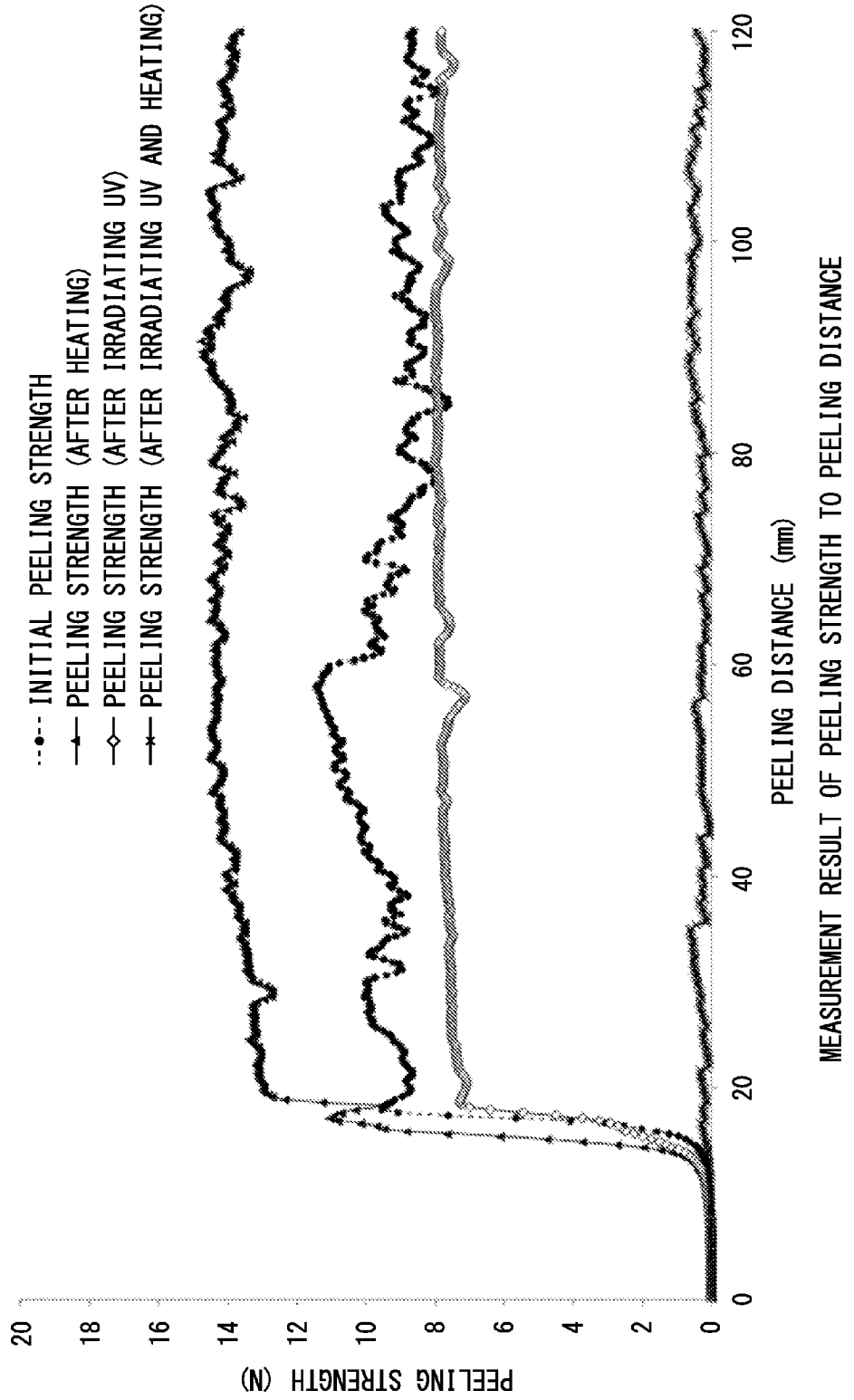
FIG. 4 shows the relationship between 180° peeling strength (N/20 mm) and peeling distance (mm/20 mm width) of an adhesive sheet before treatment, after heating or UV irradiation, and after both heating and UV irradiation in Example 4.

An adhesive sheet was produced and the dismantling properties and the adhesive properties thereof were evaluated in a manner identical to that of Example 1, except that the acrylic random copolymer (4) prepared in the Preparation Example 8 was used instead of the acrylic block copolymer (1). The evaluation results are shown in Table 1 and FIG. 4.

Comparative Example 1

Figure 5:
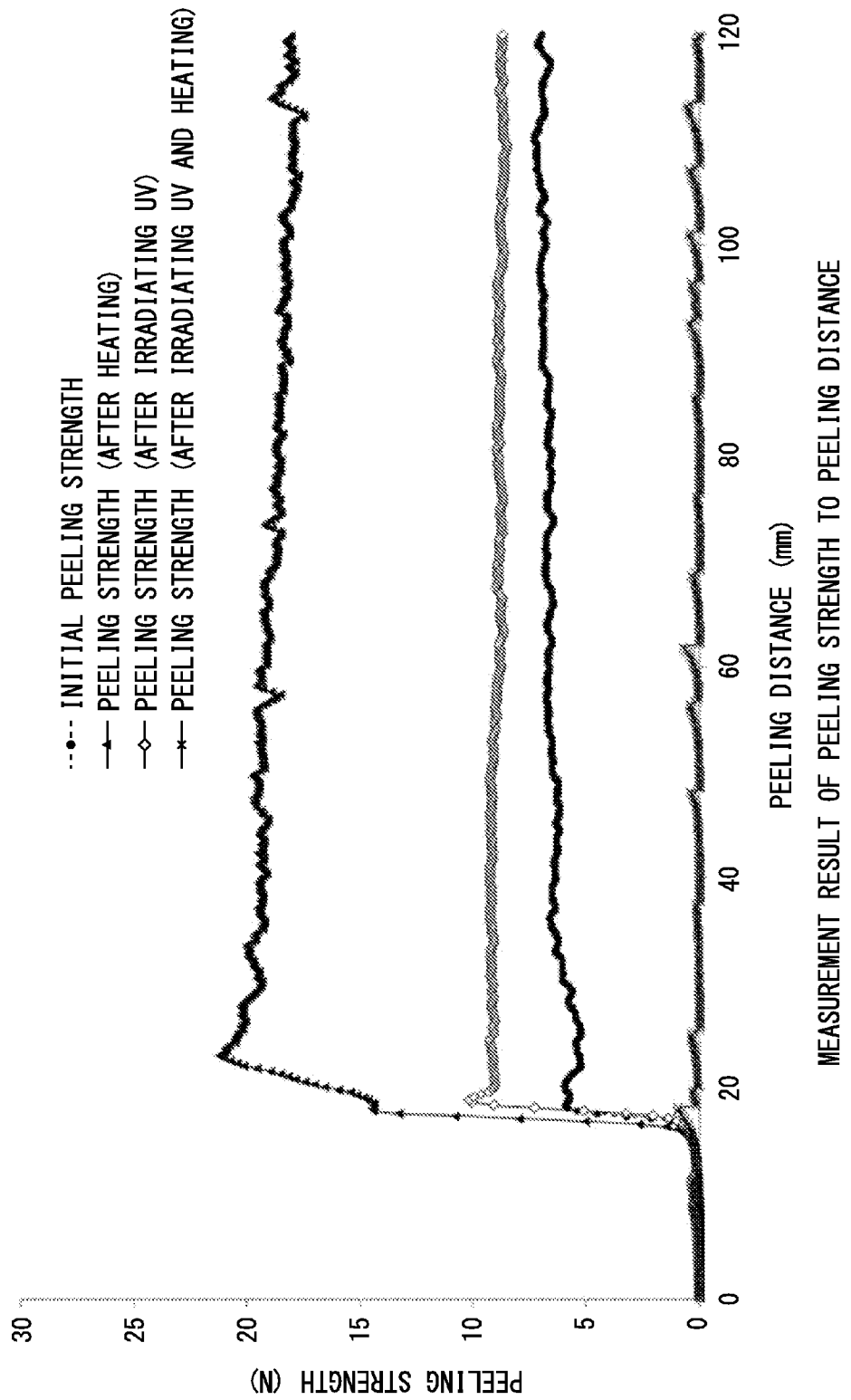
FIG. 5 shows the relationship between 180° peeling strength (N/20 mm) and peeling distance (mm/20 mm width) of an adhesive sheet before treatment, after heating or UV irradiation, and after both heating and UV irradiation in Comparative Example 1.

An adhesive sheet was produced and the dismantling properties and the adhesive properties thereof were evaluated in a manner identical to that of Example 1, except that the acrylic random copolymer (1) prepared in the Preparation Example 3 was used instead of the acrylic block copolymer (1). The evaluation results are shown in Table 2 and FIG. 5.

Comparative Example 2

Figure 6:
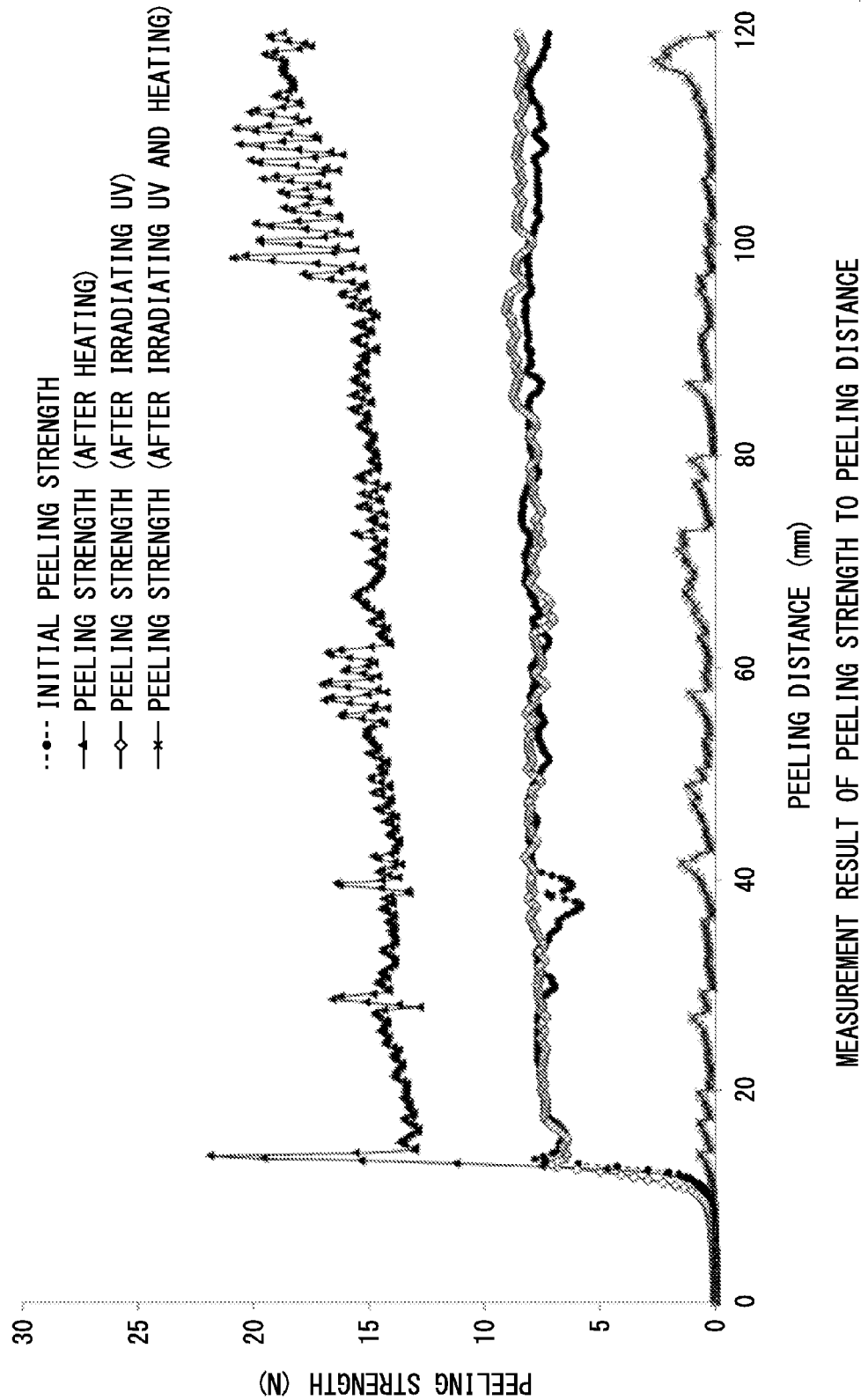
FIG. 6 shows the relationship between 180° peeling strength (N/20 mm) and peeling distance (mm/20 mm width) of an adhesive sheet before treatment, after heating or UV irradiation, and after both heating and UV irradiation in Comparative Example 2.

An adhesive sheet was produced and the dismantling properties and the adhesive properties thereof were evaluated in a manner identical to that of Example 1, except that the acrylic random copolymer (2) prepared in the Preparation Example 4 was used instead of the acrylic block copolymer (1). The evaluation results are shown in Table 2 and FIG. 6.

Comparative Example 3

Figure 7:
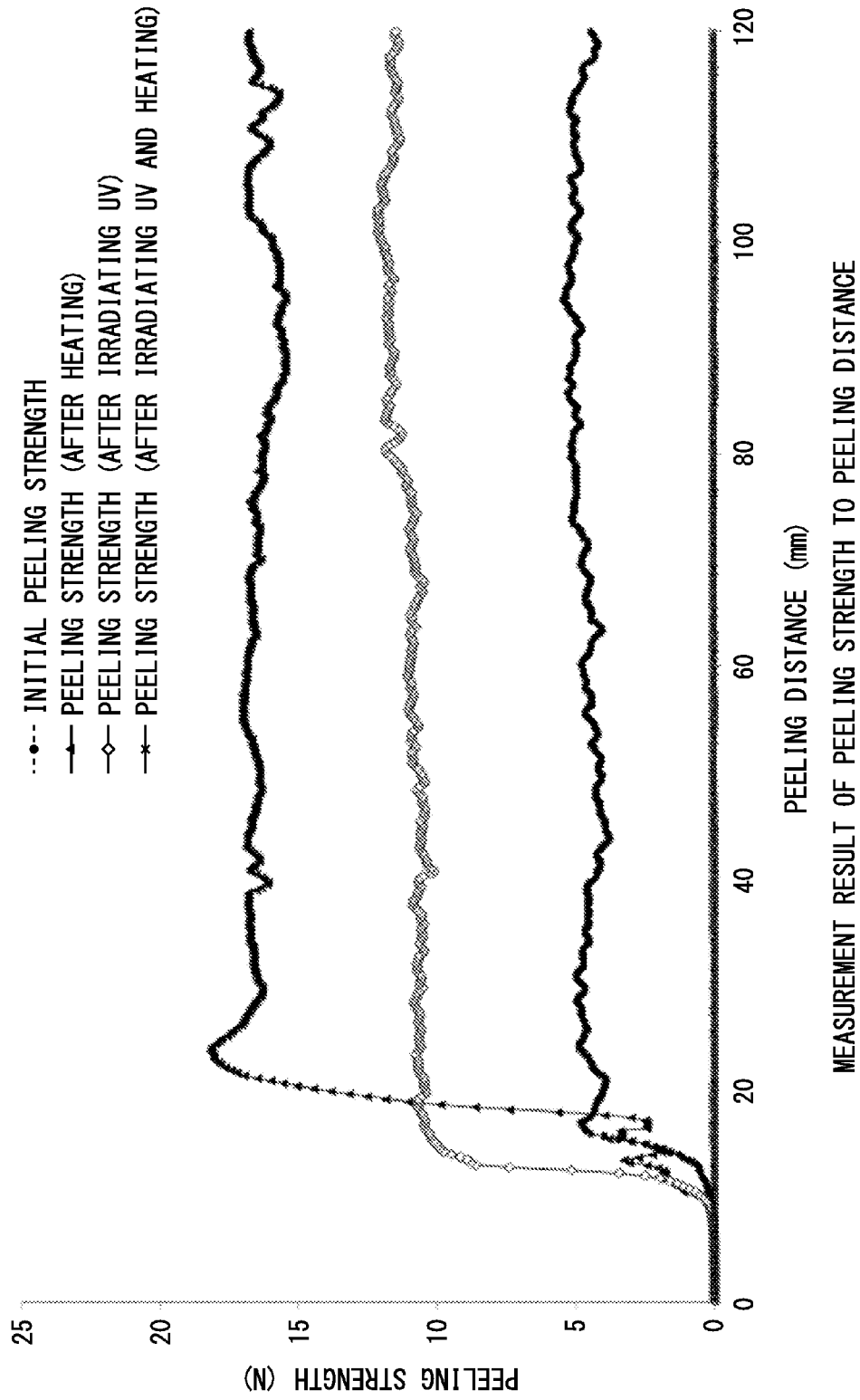
FIG. 7 shows the relationship between 180° peeling strength (N/20 mm) and peeling distance (mm/20 mm width) of an adhesive sheet before treatment, after heating or UV irradiation, and after both heating and UV irradiation in Comparative Example 3.

An adhesive sheet was produced and the dismantling properties and the adhesive properties thereof were evaluated in a manner identical to that of Example 1, except that the acrylic block copolymer (3) prepared in the Preparation Example 5 was used instead of the acrylic block copolymer (1). The evaluation results are shown in Table 2 and FIG. 7.

Comparative Example 4

Figure 8:
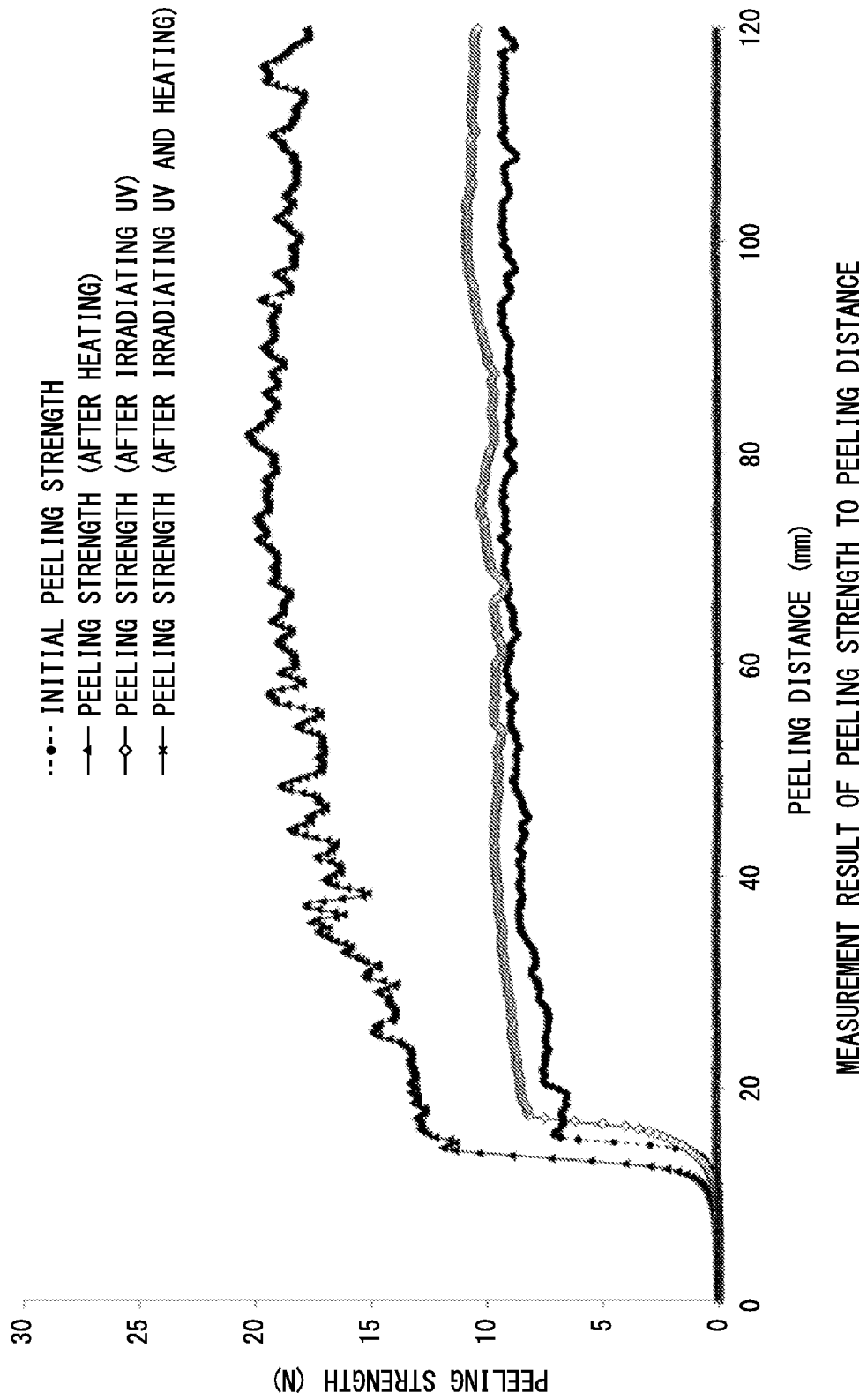
FIG. 8 shows the relationship between 180° peeling strength (N/20 mm) and peeling distance (mm/20 mm width) of an adhesive sheet before treatment, after heating or UV irradiation, and after both heating and UV irradiation in Comparative Example 4.

An adhesive sheet was produced and the dismantling properties and the adhesive properties thereof were evaluated in a manner identical to that of Example 1, except that the acrylic block copolymer (4) prepared in the Preparation Example 6 was used instead of the acrylic block copolymer (1). The evaluation results are shown in Table 2 and FIG. 8.

Example 5

Figure 9:
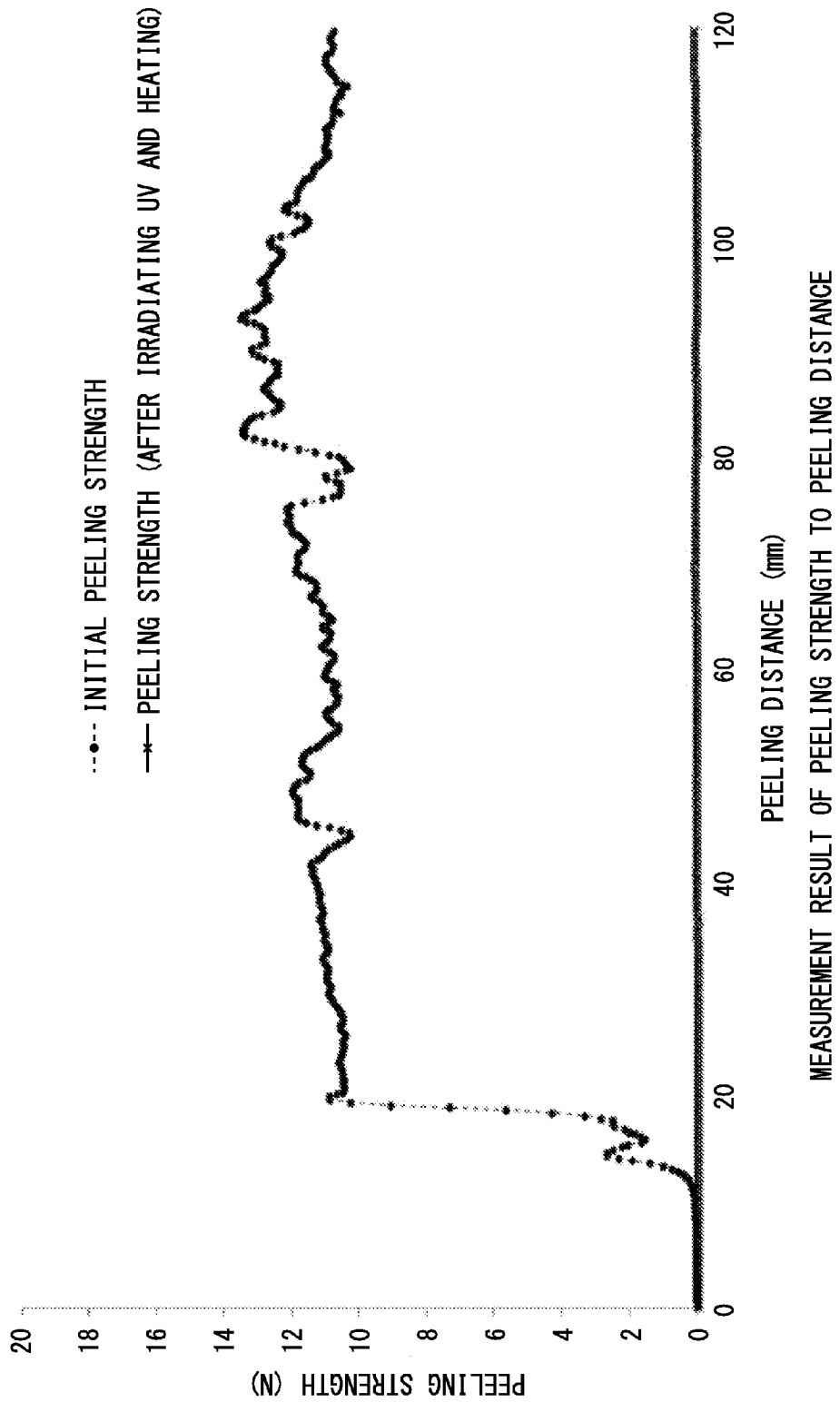
FIG. 9 shows the relationship between 180° peeling strength (N/20 mm) and peeling distance (mm/20 mm width) of an adhesive sheet before treatment, and after both heating and UV irradiation in Example 5.

An adhesive sheet was produced and the dismantling properties and the adhesive properties thereof were evaluated in a manner identical to that of Example 1, except that the acrylic block copolymer (5) prepared in the Preparation Example 9 was used instead of the acrylic block copolymer (1). The evaluation results are shown in Table 3 and FIG. 9.

Example 6

Figure 10:
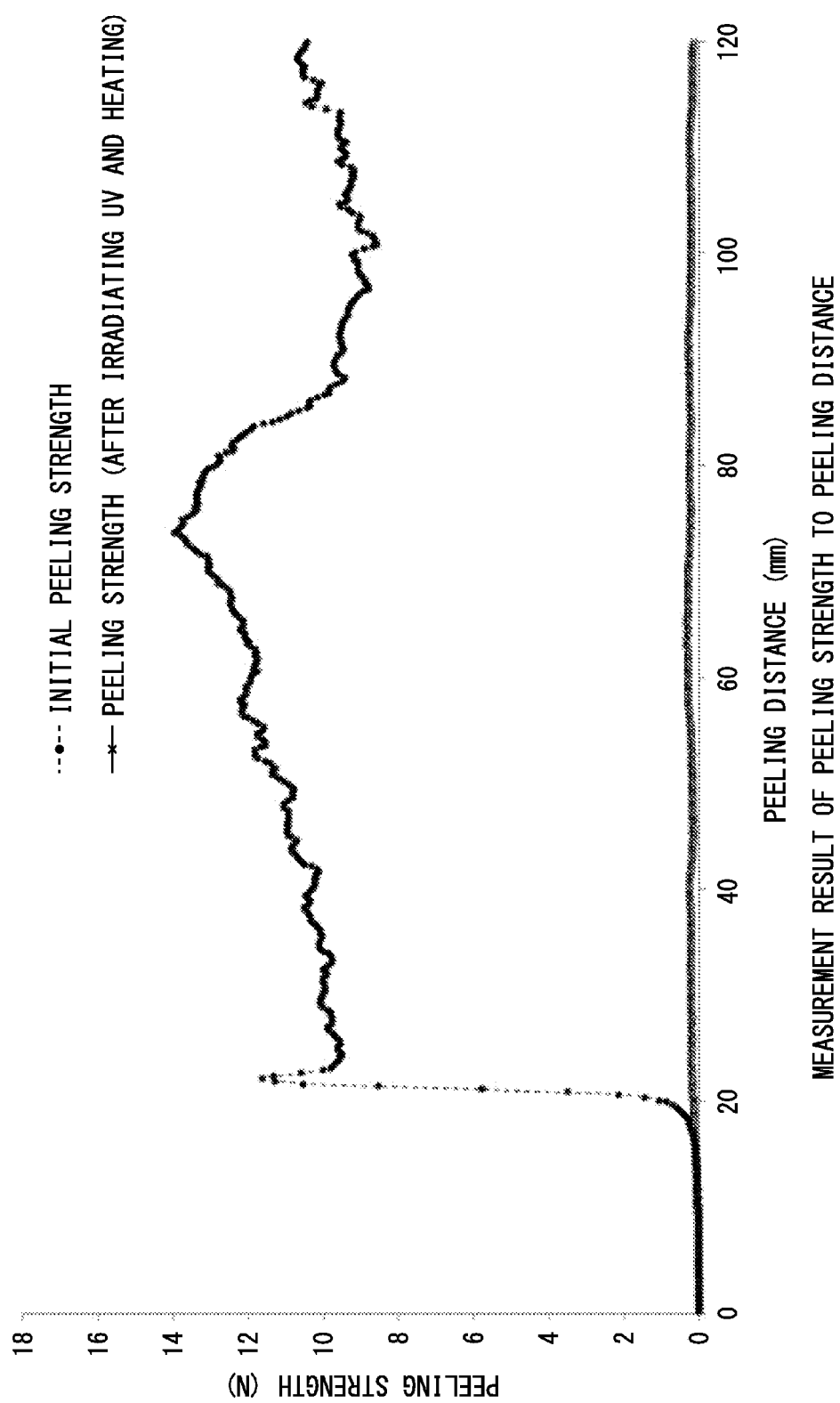
FIG. 10 shows the relationship between 180° peeling strength (N/20 mm) and peeling distance (mm/20 mm width) of an adhesive sheet before treatment, and after both heating and UV irradiation in Example 6.

An adhesive sheet was produced and the dismantling properties and the adhesive properties thereof were evaluated in a manner identical to that of Example 1, except that the acrylic block copolymer (6) prepared in the Preparation Example 10 was used instead of the acrylic block copolymer (1). The evaluation results are shown in Table 3 and FIG. 10.

Example 7

Figure 11:
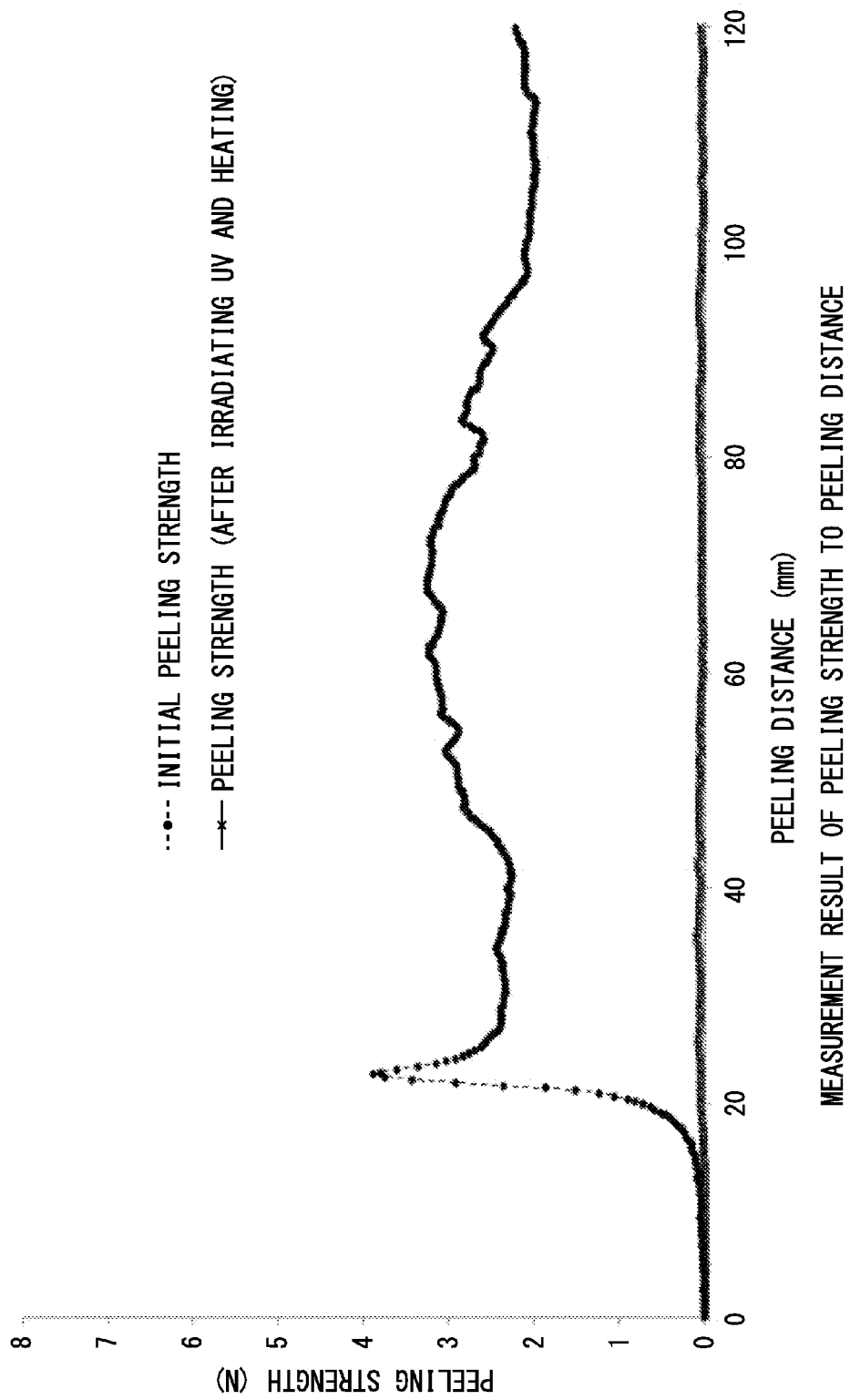
FIG. 11 shows the relationship between 180° peeling strength (N/20 mm) and peeling distance (mm/20 mm width) of an adhesive sheet before treatment, and after both heating and UV irradiation in Example 7.

An adhesive composition was produced in a manner identical to that of Example 1, except that 0.3% by mole of N-hydroxynaphthalimido triflate (NIT) relative to the t-butyl group of the acrylic block copolymer (1) was added into the acrylic block copolymer (7) obtained in the Preparation Example 11 as the photoacid generator instead of adding 0.4% by mole of N-hydroxynaphthalimido triflate (NIT) relative to the t-butyl group of the acrylic block copolymer (1) into the acrylic block copolymer (1) as the photoacid generator. Then the adhesive sheet was produced and the dismantling properties of the adhesive sheet produced were evaluated in a manner identical to that of Example 1. The results are shown in Table 3 and FIG. 11.

Example 8

Figure 12:
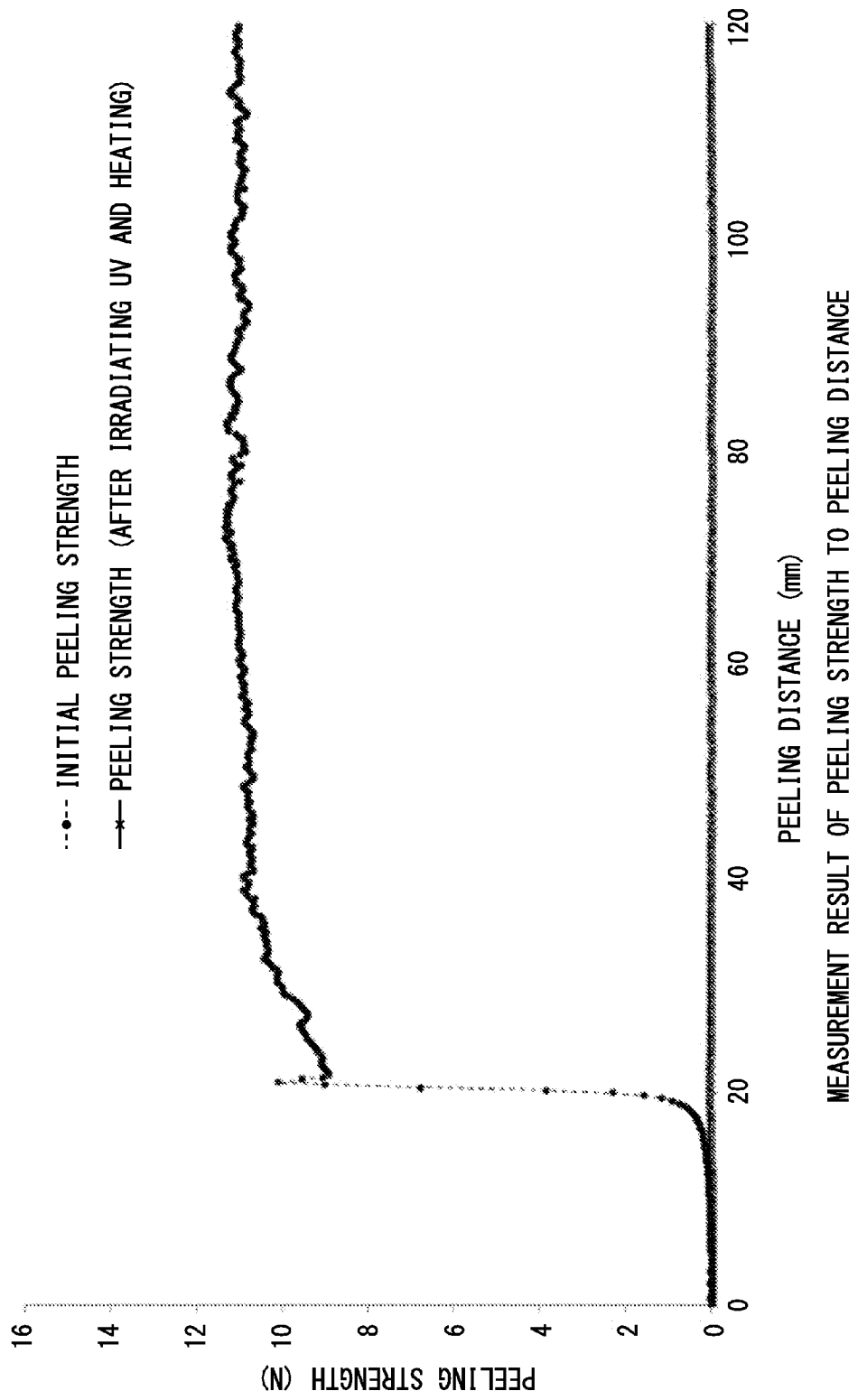
FIG. 12 shows the relationship between 180° peeling strength (N/20 mm) and peeling distance (mm/20 mm width) of an adhesive sheet before treatment, and after both heating and UV irradiation in Example 8.

An adhesive composition was produced in a manner identical to that of Example 1, except that 0.7% by mole of N-hydroxynaphthalimido triflate (NIT) relative to the t-butyl group of the acrylic block copolymer (7) was added into the acrylic block copolymer (8) obtained in the Preparation Example 12 as the photoacid generator instead of adding 0.4% by mole of N-hydroxynaphthalimido triflate (NIT) relative to the t-butyl group of the acrylic block copolymer (7) into the acrylic block copolymer (1) as the photoacid generator. Then the adhesive sheet was produced and the dismantling properties of the adhesive sheet produced were evaluated in a manner identical to that of Example 1. The results are shown in Table 3 and FIG. 12.

Example 9

Figure 13:
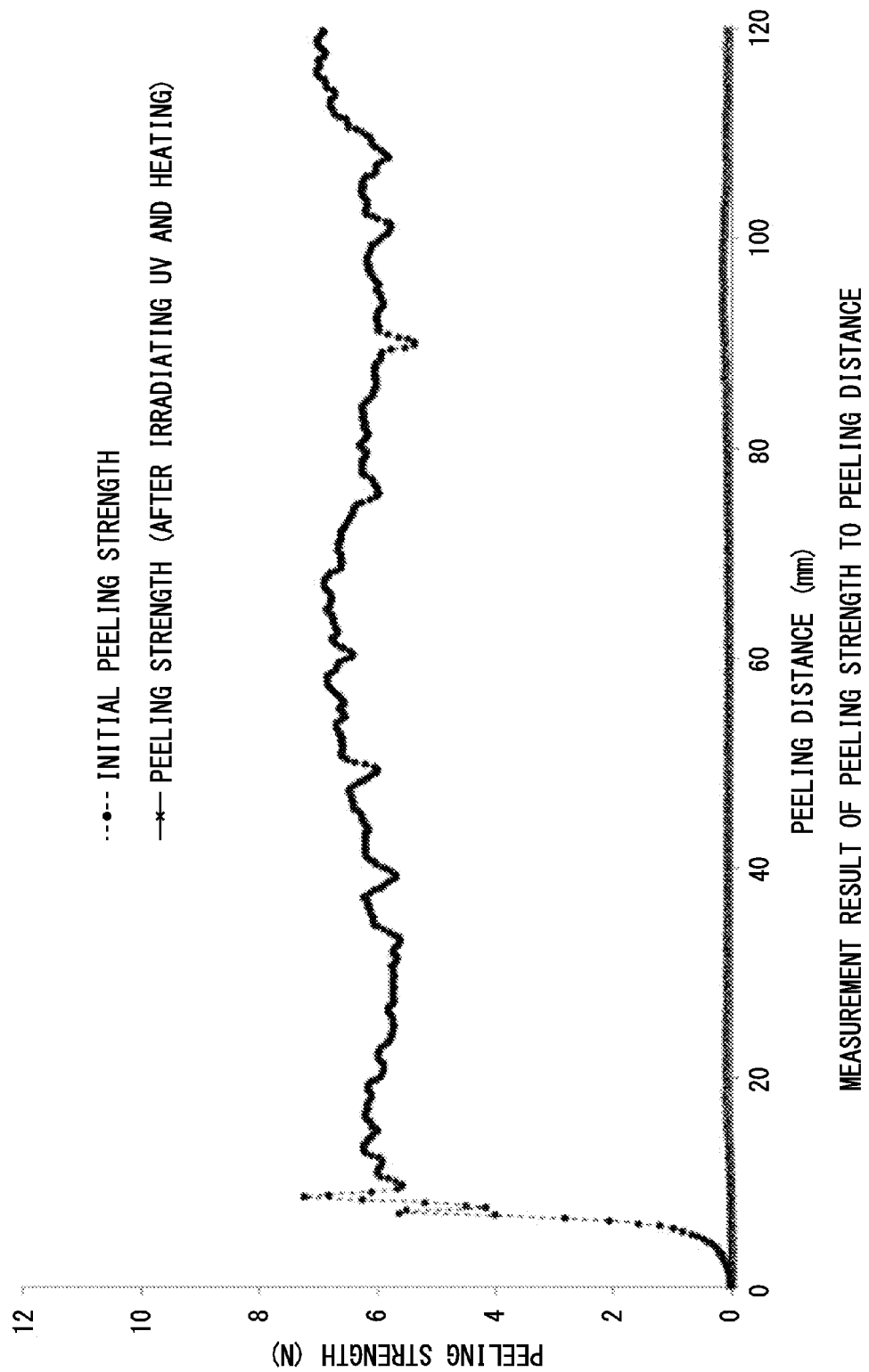
FIG. 13 shows the relationship between 180° peeling strength (N/20 mm) and peeling distance (mm/20 mm width) of an adhesive sheet before treatment, and after both heating and UV irradiation in Example 9.

An adhesive composition was produced in a manner identical to that of Example 1, except that 2.9% by mole of N-hydroxynaphthalimido triflate (NIT) relative to the t-butyl group of the acrylic block copolymer (7) was added into the acrylic block copolymer (9) obtained in the Preparation Example 13 as the photoacid generator instead of adding 0.4% by mole of N-hydroxynaphthalimido triflate (NIT) relative to the t-butyl group of the acrylic block copolymer (7) into the acrylic block copolymer (1) as the photoacid generator Then the adhesive sheet was produced and the dismantling properties of the adhesive sheet produced were evaluated in a manner identical to that of Example 1. The results are shown in Table 3 and FIG. 13.

Example 10

An adhesive composition was produced in a manner identical to that of Example 1, except that the acrylic block copolymer (10) prepared in the Preparation Example 14 was used instead of the acrylic block copolymer (1). Then the adhesive sheet was produced and the dismantling properties of the adhesive sheet produced were evaluated in a manner identical to that of Example 1. The evaluation results are shown in Table 3 and FIG. 14.

Example 11

An adhesive composition was produced in a manner identical to that of Example 15, except that the acrylic block copolymer (11) prepared in the Preparation Example 15 was used instead of the acrylic block copolymer (1). Then the adhesive sheet was produced and the dismantling properties of the adhesive sheet produced were evaluated in a manner identical to that of Example 1. The evaluation results are shown in Table 3.

<Dismantling Properties Test>

The adhesive sheet produced in Examples 1 to 5 and Comparative Examples 1 to 4 was cut in a strip form of 20 mm in width and 175 mm in length. Then, the striped adhesive sheet was put on a SUS plate of 50 mm in width, 150 mm in length, and 0.5 mm in thickness, and a hand roller of 2 kg in weight moved on the striped adhesive sheet back and forth one time at 23° C. and 50% humidity, and thereby one test piece was obtained. Similarly, total four test pieces were obtained.

(Initial 180° Peeling Strength)

Among four test pieces attached to the SUS plate with pressure, one test piece was left as it is at 23° C. and 50% humidity for 1 hour. After that, the test piece was peeled off at 180° relative to the test piece with the peeling speed at 30 mm/min. using a peeling tester, and the initial 180° peeling strength was measured.

(180° Peeling Strength After Heating)

Among four test pieces attached to the SUS plate with pressure, one test piece was left as it is at 23° C. and 50% humidity for 30 minutes, heated at 100° C. for 1 hour, and then allowed to cool to 23° C. for about 30 minutes. After that, the test piece was peeled off at 180° relative to the test piece with the peeling speed at 30 mm/min. using a peeling tester, and the 180° peeling strength was measured.

(180° Peeling Strength After UV Irradiation)

Among four test pieces attached to the SUS plate with pressure, one test piece was left as it is at 23° C. and 50% humidity for 30 minutes, irradiated with UV light for 1 hour at room temperature, and then left as it is for 30 minutes. After that, the test piece was peeled off at 180° relative to the test piece with the peeling speed at 30 mm/min. using a peeling tester, and the 180° peeling strength was measured.

(180° Peeling Strength After Heating and UV Irradiation)

Among four test pieces attached to the SUS plate with pressure, one test piece was left as it is at 23° C. and 50% humidity for 30 minutes, irradiated with UV light for 1 hour, heated at 100° C. for 1 hour, and then allowed to cool to 23° C. for about 30 minutes. After that, the test piece was peeled off at 180° relative to the test piece with the peeling speed at 30 mm/min. using a peeling tester, and the 180° peeling strength was measured.

An average 180° peeling strength at a peeling distance of 30 to 120 mm is shown in Tables.

Moreover, the UV irradiation was carried out by using Toshiba mercury lamp SHL-100 UVQ-2 (75 W) as a light source, maintaining the distance between the light source and the test piece to 10 cm, and irradiating UV light at 15 minutes or longer after turning on the lamp. Moreover, UV light is irradiated in the same manner as explained above in the following Examples and Comparative Examples.

The adhesive sheet produced in Examples 6 to 11 was cut in a strip form of 20 mm in width and 175 mm in length. Then, the striped adhesive sheet was put on a SUS plate of 50 mm in width, 150 mm in length, and 0.5 mm in thickness, and a hand roller of 2 kg in weight moved on the striped adhesive sheet back and forth one time at 23° C. and 50% humidity, and thereby one test piece was obtained. Similarly another test piece was obtained. That is, two test pieces were obtained.

(Initial 180° Peeling Strength)

Among two test piece attached to the SUS plate with pressure, one test piece was left as it is at 23° C. and 50% RH for 1 hour. After that, the test piece was peeled off at 180° relative to the test piece with the peeling speed at 30 mm/min. using a peeling tester, and the initial 180° peeling strength was measured.

(180° Peeling Strength After UV Irradiation and Heating)

Among two test piece attached to the SUS plate with pressure, another test piece was left as it is at 23° C. and 50% RH for 30 minutes, irradiated with UV light for 1 hour, heated at 100° C. for 1 hour, and then allowed to cool to 23° C. for about 30 minutes. After that, the test piece was peeled off at 180° relative to the test piece with the peeling speed at 30 mm/min. using a peeling tester, and the 180° peeling strength was measured.

In Table, an average 180° peeling strength at a peeling distance of 30 to 120 mm is shown, and when stick-slip was generated, the amplitude is shown.

Moreover, when irradiating UV light, the same light source that was used above was used.

<Adhesive Properties Test>

The adhesive sheet produced was cut in a strip form of 20 mm in width and 175 mm in length. Then, the striped adhesive sheet was put on a SUS plate of 50 mm in width, 150 mm in length, and 0.5 mm in thickness, and a hand roller of 2 kg in weight moved on the striped adhesive sheet back and forth one time at 23° C. and 50% humidity, and thereby a test piece was obtained. Similarly another test piece was obtained. That is, two test pieces were obtained.

(Adhesive Strength at 23° C.)

Among two test piece attached to the SUS plate with pressure, one test piece was left as it is at 23° C. and 50% RH for 1 hour. After that, the test piece was peeled off at 180° relative to the test piece with the peeling speed at 300 mm/min. using a peeling tester, and 180° peeling strength was measured.

(Adhesive Strength at 0° C.)

Among two test piece attached to the SUS plate with pressure, another test piece was left as it is at 0° C. for 1 hour. After that, the test piece was peeled off at 180° relative to the test piece with the peeling speed at 300 mm/min. using a peeling tester, and 180° peeling strength was measured.

The results of the measurement using the adhesive sheet produced in Examples 1 to 4 and Comparative Examples 4 are shown in Tables as [N1].

Similarly, three test pieces were evaluated at 23° C. and 0° C., and an average of 180° peeling strength at each temperature is shown in Tables as [N3].

TABLE 1

| | | Example 1 | Example 2 | Example 3 | Example 4 |
|---|---|---|---|---|---|
| Copolymerization form | | Block | Block | Random | Random |
| Acrylic polymer | tBA | 33.4 | 37.9 | 39 | 37.9 |
| | co-tBA | 1.1 | 5.4 | | |
| | total tBA | 34.5 | 43.3 | 39 | 37.9 |
| | 2EHA | 47 | 52.5 | 42 | 41.3 |
| | HEA | 18.5 | 4.3 | 19 | 20.8 |
| Molecular weight | Mw | 462000 | 383000 | 580300 | 333700 |
| | Mw/Mn | 1.74 | 1.49 | 2.03 | 2.29 |
| Acid generator | NIT | 0.4 | 0.4 | 0.4 | 0.4 |
| Dismantling Properties Test N/20 mm | Initial | 9 | 5.6 | 9.1 | 9.2 |
| | Heating | 17.6 | 8.3 | 12.2 | 14.2 (CF) |
| | UV irradiation | 12.3 | 9.7 | 12.4 | 7.8 |
| | UV irradiation → Heating | 0 | 0.2 | 0.62 (SS) | 0.37 (SS + CF) |
| Adhesive Properties Test N/20 mm | 23° C. [N1] | 11.5 | 8 | 8.6 | 9 |
| | 0° C. [N1] | 2 | 3.1 | 2 | 1.6 |
| | 23° C. [N3] | 9.67 | 7.1 | 8.4 | 7.5 |
| | 0° C. [N3] | 3.7 | 4 | 2 | 1.6 |

TABLE 2

| | | Comparative Example 1 | Comparative Example 2 | Comparative Example 3 | Comparative Example 4 |
|---|---|---|---|---|---|
| Copolymerization form | | Ramdom | Ramdom | Block | Block |
| Acrylic polymer | tBA | 33.1 | 35.5 | 28.7 | 24.2 |
| | co-tBA | | | 4 | 5 |
| | total tBA | 33.1 | 35.5 | 32.7 | 29.2 |
| | nBA | 53 | 60.8 | 52.3 | 67 |
| | HEA | 13.9 | 3.7 | 14.9 | 3.9 |
| Molecular weight | Mw | 475000 | 463000 | 570000 | 354000 |
| | Mw/Mn | 1.88 | 1.67 | 2.14 | 1.48 |
| Acid generator | NIT | 0.4 | 0.4 | 0.4 | 0.4 |
| Dismantling Properties Test N/20 mm | Initial | 6.7 | 7.7 | 4.8 | 9.1 |
| | Heating | 18.7 | 16 | 16.5 | 18.8 |
| | UV irradiation | 8.9 | 8.1 | 11.2 | 10.2 |
| | UV irradiation → Heating | 0 (SS) | 0.55 (SS + CF) | 0 | 0 |
| Adhesive Properties Test N/20 mm | 23° C. [N1] | 7 | 8.1 | 9.3 | 8.7 |
| | 0° C. [N1] | 0.32 | 0.65 | 0.1 | 0.2 |
| | 23° C. [N3] | 9.2 | 7.3 | 8.7 | 7.4 |
| | 0° C. [N3] | 0.31 | 0.65 | 0.15 | 0.22 |

TABLE 3

|  |  | Example 5 | Example 6 | Example 7 | Example 8 | Example 9 | Example 10 | Example 11 |
|---|---|---|---|---|---|---|---|---|
| Copolymerization form | | Block | Block | Block | Block | Block | Block | Block |
| Acrylic polymer | tBA | 33.8 | 32.3 | 40.7 | 18.6 | 3.3 | 28.1 | 32.3 |
| | co-tBA | 6.5 | 7.9 | 4.9 | 2.3 | 1.5 | 8.3 | 4.7 |
| | Total tBA | 40.3 | 40.2 | 45.6 | 20.9 | 4.8 | 36.4 | 37 |
| | 2EHA | 48.9 | 52 | 44.5 | 56.8 | 63.2 | 55.3 | 45.5 |
| | HEA | 10.8 | 7.8 | 9.9 | 22.3 | 32 | 8.3 | |
| | HBA | | | | | | | 17.5 |
| Molecular weight | Mw | 269000 | 304000 | 196000 | 357000 | 395000 | 372000 | 323000 |
| | Mw/Mn | 1.43 | 1.49 | 1.4 | 1.66 | 1.56 | 1.82 | 1.67 |
| Acid generator | NIT | 0.4 | 0.4 | 0.3 | 0.7 | 2.9 | 0.4 | 0.4 |
| Dismantling Properties Test N/20 mm | Initial | 11.5 | 10.8 | 2.8 | 10.9 | 6.4 | 8.3 | 11.7 |
| | UV irradiation → Heating | 0 | 0.2 | 0.1 | 0 | 0.09 | 0.09 | 0.4 |
| Adhesive Properties Test N/20 mm | 23° C. [N3] | 10.6 | 6.05 | 4.85 | 9.7 | 5 | 7.4 | 9.9 |
| | 0° C. [N3] | 5.5 | 2.4 | 2.1 | 6 | 5.2 | 3 | 7.5 |

In Tables 1 to 3, the numbers in "Acrylic polymer" means molar rate of the monomer constituting the acrylic polymer. In addition, the abbreviation in Tables denotes the following composition. Furthermore, in Tables, "SS" means that stick-slip was caused, "CF" means that cohesive failure was caused, and "SS+CF" means that both stick-slip and cohesive failure are jointly caused.
tBA: t-butyl acrylate constituting the poly t-butyl acrylate
co-tBA: t-butyl acrylate in the poly t-butyl acrylate chain and the other polyacrylate chain made of other copolymer components
2EHA: 2-ethyl hexyl acrylate
nBA: n-butyl acrylate
HEA: 2-hydroxyethyl acrylate
HBA: 4-hydroxybutyl acrylate As shown in Tables above, the adhesive composition in Examples 1 to 11 in the present invention has favorable dismantling properties while maintaining favorable adhesive properties at ordinary temperature and lower temperatures. In addition, the adhesive composition obtained by using the block copolymer in Examples 1, 2, and 5 to 11 did not cause stick-slip when disassembling, especially had preferable dismantling properties. Furthermore, the adhesive composition in Examples 1 and 5 to 11 could be favorably peeled at the interface between the adhesive layer and the substrate when disassembling. On the other hand, the adhesive composition in Comparative Examples 1 to 4 had dismantling properties, but poor adhesive properties at lower temperatures.

INDUSTRIAL APPLICABILITY

The easily dismantlable adhesive composition of the present invention can be easily dismantlable without an adhesive deposit by simple means such as heat or light while maintaining excellent adhesive properties under ordinary temperature and lower temperature conditions. Therefore, the easily dismantlable adhesive composition of the present invention can be used as a recycled or reused product. For example, the easily dismantlable adhesive composition can be used to fix parts permanently or temporarily or attach a label for showing product information in various industrial fields such as OA apparatuses, IT products, home electric appliances, and automobiles which are produced regardless of region or season, without special limitations. In addition, the easily dismantlable adhesive composition can be easily dismantlable by a simple heating device or an energy ray irradiation device.

The invention claimed is:

1. A dismantlable adhesive composition including an acrylic polymer, and an acid catalyst or an acid generator,
   wherein the acrylic polymer includes a (meth)acrylate monomer having a carboxyl precursor group, 2-ethyl hexyl acrylate, and a monomer having a polar group as a monomer,
   wherein the polar group is a hydroxyl group, carboxyl group, amino group, imino group or amide group,
   wherein the monomer constituting the acrylic polymer includes 1 to 75% by mass of the (meth)acrylate monomer having a carboxyl precursor group, 20% by mass or more of the 2-ethyl hexyl acrylate, and 1 to 30% by mass of the monomer having the polar group; and
   wherein the dismantlable adhesive composition is a pressure sensitive adhesive composition.

2. The dismantlable adhesive composition according to claim 1, wherein the (meth)acrylate monomer having a carboxyl precursor group is at least one selected from the group consisting of tert-butyl (meth)acrylate, 2-methyl-2-adamantyl (meth)acrylate, 2-ethyl-2-adamantyl (meth)acrylate, bornyl (meth)acrylate, isobornyl (meth)acrylate, cyclohexyl (meth)acrylate, and benzyl (meth)acrylate.

3. The dismantlable adhesive composition according to claim 1, wherein the monomer having a polar group is a vinyl monomer having a hydroxyl group.

4. The dismantlable adhesive composition according to claim 1, wherein the acrylic polymer is an acrylic block polymer including a poly(meth)acrylate chain (A) which is made of the (meth)acrylate monomer having a carboxyl precursor group and a poly(meth)acrylate chain (B) containing the 2-ethyl hexyl acrylate and the monomer having a polar group as a monomer.

5. A dismantlable adhesive tape having an adhesive layer including a dismantlable adhesive composition according to claim 1.

6. The dismantlable adhesive composition according to claim 2, wherein the monomer having a polar group is a vinyl monomer having a hydroxyl group.

7. The dismantlable adhesive composition according to claim 2, wherein the acrylic polymer is an acrylic block polymer including a poly(meth)acrylate chain (A) which is made of the (meth)acrylate monomer having a carboxyl precursor group and a poly(meth)acrylate chain (B) containing the 2-ethyl hexyl acrylate and the monomer having a polar group as a monomer.

8. The dismantlable adhesive composition according to claim 3, wherein the acrylic polymer is an acrylic block polymer including a poly(meth)acrylate chain (A) which is made of the (meth)acrylate monomer having a carboxyl precursor group and a poly(meth)acrylate chain (B) containing the 2-ethyl hexyl acrylate and the monomer having a polar group as a monomer.

9. A dismantlable adhesive tape having an adhesive layer including a dismantlable adhesive composition according to claim 2.

10. A dismantlable adhesive tape having an adhesive layer including a dismantlable adhesive composition according to claim 3.

* * * * *